(12) United States Patent
Isono

(10) Patent No.: US 8,978,377 B2
(45) Date of Patent: Mar. 17, 2015

(54) CYLINDER DEVICE

(75) Inventor: Hiroshi Isono, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 616 days.

(21) Appl. No.: 13/390,450

(22) PCT Filed: Aug. 27, 2010

(86) PCT No.: PCT/JP2010/064592
§ 371 (c)(1),
(2), (4) Date: Feb. 14, 2012

(87) PCT Pub. No.: WO2011/024950
PCT Pub. Date: Mar. 3, 2011

(65) Prior Publication Data
US 2012/0144822 A1 Jun. 14, 2012

(30) Foreign Application Priority Data

Aug. 31, 2009 (JP) .................... 2009-200155

(51) Int. Cl.
| F15B 7/00 | (2006.01) |
| B60T 13/16 | (2006.01) |
| B60T 7/04 | (2006.01) |
| B60T 8/44 | (2006.01) |
| B60K 6/445 | (2007.10) |

(52) U.S. Cl.
CPC .............. B60T 13/165 (2013.01); B60T 7/042 (2013.01); B60T 8/441 (2013.01); *B60T 2270/604* (2013.01); *B60W 2540/10* (2013.01); *B60K 6/445* (2013.01); *Y02T 10/6239* (2013.01)
USPC ................. 60/545; 60/581; 60/533

(58) Field of Classification Search
USPC ............... 60/533, 538, 545, 581, 582, 583
See application file for complete search history.

(56) References Cited

U.S. PATENT DOCUMENTS

| 2002/0014379 A1 | 2/2002 | Oka et al. |
| 2004/0108770 A1 | 6/2004 | Maki |

FOREIGN PATENT DOCUMENTS

| JP | A-2002-2478 | 1/2002 |
| JP | A-2004-182035 | 7/2004 |
| JP | A-2006-264359 | 10/2006 |
| JP | A-2007-055588 | 3/2007 |
| JP | A-2008-024098 | 2/2008 |

OTHER PUBLICATIONS

Nov. 30, 2010 International Search Report issued in International Patent Application No. PCT/JP2010/064592 (with translation).

*Primary Examiner* — Edward Look
*Assistant Examiner* — Daniel Collins
(74) *Attorney, Agent, or Firm* — Oliff PLC

(57) ABSTRACT

A cylinder device is characterized in: that it selectively realizes an operation-force dependent pressurizing state where brake fluid is pressurized by operation force and a high-pressure-source-pressure dependent pressurizing state where brake fluid is pressurized depending on a pressure from a high-pressure-source device; that there are defined an inter-piston chamber in front of an input piston by an insertion of the input piston into a pressurizing piston, an input chamber in the back of a flange of the pressurizing piston at the pressure from the high pressure source device, and an opposing chamber in front of the flange; and that the cylinder device has a mechanism elastically pressurizing an reaction force chamber formed by a communication between the inter-piston and the opposing chambers, and a mechanism switching communication/not-communication state between the reaction chamber and a reservoir.

9 Claims, 6 Drawing Sheets

CYLINDER DEVICE

TECHNICAL FIELD

The present invention relates to a cylinder device which pressurizes a brake fluid and supplies the brake fluid to a brake device provided at a wheel.

BACKGROUND ART

In a hydraulic brake system, for example, a cylinder device like one disclosed in the following Patent Document 1 is often employed. That cylinder device has a function which pressurizes a brake fluid using a pressure inputted from an external high pressure source, and is a device called as a master cylinder with a function of hydraulic booster.
Patent Document 1: JP-A-2008-24098

DISCLOSURE OF THE INVENTION

(A) Summary of the Invention

When the above mentioned cylinder device is employed in a hybrid vehicle, it is necessary not to generate a hydraulic brake force despite of a driver's operation of an operation member since the vehicle can use, as a brake force, a regenerative brake force. At the same time, it is desired that operational feeling in operating the operation member is favorable. Additionally, in a case, such as a failure of power system, since it is necessary to pressurize a brake fluid by driver's operation force, it is desired that the brake fluid is efficiently pressurized even in that case. Moreover, given that this cylinder device is disposed in a vehicle, a favorable specification for mounting it, that is, compactness is desired. Seen from such a standpoint, there are left plenty of room for improving the above cylinder device, and a variety of modifications can improve a utility of the cylinder device.

This invention was carried out in the light of the situation described above, and it is therefore an object of the invention to provide a cylinder device with a high utility.

To achieve the object, a cylinder device of the present invention is, to be short, characterized in: that the cylinder device selectively realizes an operation-force dependent pressurizing state in which a brake fluid is pressurized by an operation force applied on an operation member and a high-pressure-source-pressure dependent pressurizing state in which the brake fluid is pressurized, independently of forward movement of an input piston, depending on a pressure from a high pressure source; that an inter-piston chamber is defined in front of the input piston by that the input piston is inserted in a blind hole of a pressurizing piston from the backward; that there are defined an input chamber which is located in the back of a flange portion of the pressurizing piston and to which the pressure from the high pressure source is inputted, and an opposing chamber in front of the flange portion; and that the cylinder device is equipped with a mechanism which elastically pressurizes an operation-reaction-force chamber formed by the communication between the inter-piston chamber and the opposing chamber and a mechanism which switches a communication state and a not-communication state between the operation-reaction-force chamber and a reservoir.

According to the cylinder device of the present invention, as specifically explained later, because the input piston is inserted in the blind hole provided in the pressurizing piston, the number of high-pressure seals required to engage with the input piston is reduced. Therefore, it is possible to decrease an influence that a friction resistance gives on the operational feeling of the operation member. Moreover, because a stroke simulator includes the mechanism which pressurizes the operation-reaction-force chamber, the stroke simulator can be disposed inside of the cylinder device, thereby allowing the cylinder device to be constructed more compact. Furthermore, because the single opposing chamber is formed owing to the communication between the inter-piston camber and the opposing chamber, it is possible to make a volume of the inter-piston chamber relatively small. This enables a distance that the input piston moves forward to come into abutting contact with the pressurizing piston to be short, thereby reducing a play in a brake operation in a failure condition etc., whereby the operational feeling in the brake operation can be made favorable.

(B) Forms of Claimable Invention

There will be exemplified and explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

In the following forms, the form (1) corresponds to claim 1, the form (4) corresponds to claim 2, the form (5) corresponds to claim 3, the form (2) corresponds to claim 4, the form (3) corresponds to claim 5, the form (9) corresponds to claim 6, the form that the form (10) and the form (11) are combined corresponds to claim 7, the form that the form (7) and the form (12) are combined corresponds to claim 8, and the form that the form (8) and the form (13) are combined corresponds to claim 9, respectively.

(1) A cylinder device which supplies, in order to operate a brake device provided at a wheel, a pressurized brake fluid to the brake device, comprising:

a housing whose front end portion is closed and which is shaped like a tube;

a pressurizing piston which has a main body portion, a flange portion formed on a circumference of the main body portion, and a blind hole opening at a rear end of the pressurizing piston and which is disposed in the housing so as to define (A) a pressurizing chamber which is located in a front side of the pressurizing piston and which pressurizes the brake fluid supplied to the brake device, (B) an input chamber in which a pressure from a high pressure source is inputted in a rear side of the flange portion, and (C) an opposing chamber which is located in a front side of the flange portion with the flange portion interposed between the input chamber and the opposing chamber and which is opposed to the input chamber, respectively;

an input piston which is inserted in the blind hole of the pressurizing piston so as to define an inter-piston chamber in front of the input piston by the input piston and the pressurizing piston, and which is connected to an operation member at a rear end of the input piston;

an inter-chamber communication passage which always permits communication between the opposing chamber and the inter-piston chamber such that the opposing chamber and the inter-piston chamber serve as a single operation-reaction-force chamber, for accommodating a volume change of the opposing chamber and a volume change of the inter-piston chamber with each other that are caused by a forward and rearward movement of the pressurizing piston;

an elastic-force dependent pressurizing mechanism which pressurizes the operation-reaction-force chamber formed by the inter-chamber communication passage depending on elastic force; and a communication-state switching mechanism which selectively realizes a communication state in which the reservoir and the operation-reaction-force chamber communicate with each other and a not-communication state in which they do not communicate with each other, and wherein the cylinder device is configured such that, in the not-communication state, an operation reaction force, in accordance with an operation amount of the operation member, is generated depending on the pressurization of the operation-reaction-force chamber by the elastic-force dependent pressurizing mechanism, while the brake fluid in the pressurizing chamber is permitted to be pressurized in accordance with the pressure inputted from the high pressure source to the input chamber; in the communication state, a volume of the operation-reaction-force chamber is permitted to be reduced, thereby permitting the input piston to come into abutting contact with the pressurizing piston by a forward movement of the input piston, whereby the brake fluid in the pressurizing chamber is permitted to be pressurized by the operation force applied to the operation member.

In the cylinder device according to this form, the input piston is inserted in the pressurizing piston and, in front of that input piston, the liquid chamber (inter-piston chamber) is defined by the input piston and the pressurizing piston. In addition, the pressurizing piston has the flange portion and is configured to slide on the housing at the flange portion. In the rear side of the flange portion, there is defined the liquid chamber (input chamber) into which the pressure from the high pressure source is inputted and, in the front side of the flange, there is defined the liquid chamber (opposing chamber) which is opposed to the input chamber with the flange portion interposed. Since the inter-piston chamber and the opposing chamber always communicate with each other by the inter-chamber communication passage, the single liquid chamber (operation-reaction-force chamber) is formed.

In the cylinder device according to this form, at a normal condition, the input chamber and the opposing chamber are hermetically closed, that is, the above operation-reaction-force chamber is put in the not-communication state. The cylinder device is configured such that, in the not-communication state, where the pressurizing piston moves forward, as the volume of the inter-piston chamber increases, the volume of the opposing chamber decreases and, on the other hand, where the pressurizing piston moves backward, as the volume of the opposing chamber decreases, the volume of the inter-piston chamber increases. In other words, the cylinder device is configured such that the increase or decrease of brake fluid of one of the two chambers is equal to the decrease or increase of brake fluid of the other. Accordingly, this state is a state in which a relative movement of the input piston and pressurizing piston is permitted under the condition that the input piston does not come into abutting contact with the pressurizing piston. Where the pressure is inputted into the input chamber in this state, a state (high-pressure-source-pressure dependent pressurizing state) is realized in which the pressurizing piston pressurizes the pressurizing chamber depending on the pressure of the input chamber independently of the forward movement of the input piston. Additionally, in order to make the driver realize the operational feeling of the operation member in the high-pressure-source-pressure dependent pressurizing state, the above elastic-force dependent pressurizing mechanism can apply the operation reaction force in accordance with an amount of the forward movement of the input piston, that is, the operation amount of the operation member. In other words, there is configured a mechanism for making the operation reaction force becomes larger as the operation amount of the operation member increases by disposing an elastic member whose elastic deformation amount becomes larger as an amount of the forward movement of the input piston increases. In another view, the cylinder device has a function permitting the forward movement of the input piston in accordance with the operation reaction force, in other words, a function permitting the operation of the operation member whose operation amount accords with the operation reaction force. That is, in the cylinder device, a stroke simulator is constituted by the above elastic-force dependent pressurizing mechanism.

On the other hand, in a failure condition such as an electrical failure, the cylinder device according to this form is configured such that the above operation-reaction-force chamber and the reservoir are in the communication state. In this state, the volume of the operation-reaction-force chamber is permitted to decrease, whereby the input piston is permitted to come into abutting contact with the pressurizing piston, whereby a thrust force of the input piston can pressurize the pressurizing chamber. In other words, there is realized a state (operation-force dependent pressurizing state) in which the operation force applied to the operation member can pressurize the brake fluid in the pressurizing chamber. It is noted that, in this form, "the input piston comes into abutting contact with the pressurizing piston" means not only that the input piston directly comes into abutting contact with the pressurizing piston but also that the input piston indirectly comes into abutting contact with the pressurizing piston via some rigid body.

In the cylinder device according to this form, the input piston is inserted in the blind hole provided in the pressurizing piston. Therefore, high-pressure seals required to engage with the input piston in order to define each of the above liquid chambers may be disposed one by one between an outer face of the input piston and an inner face of the blind hole of the pressurizing piston and between the outer face of the input piston and a part of the housing which slidably holds the input piston, respectively. Consequently, a friction resistance against the movement of the input piston is relatively small, whereby an influence is decreased that a friction resistance gives on the operational feeling of the operation member, that is, an influence on the operational feeling in the brake operation is decreased.

Additionally, in the cylinder device according to this form, as described above, because the stroke simulator includes the elastic-force dependent pressurizing mechanism for pressurizing the above operation-reaction-force chamber, an elastic member, such as a spring, composing the stroke simulator is not needed to be disposed outside the cylinder device. In short, in the cylinder device according to this form, the stroke simulator can be disposed inside the cylinder device, thereby realizing the cylinder device compact.

Moreover, since the operation-reaction-force chamber is formed owing to the communication between the input piston and the opposing chamber, the volume of the inter-piston chamber can be made relatively small. This enables a distance between a front end of the input piston and a bottom of the blind hole to be relatively short. That reduces a play in a brake operation in a failure condition etc., whereby the operational feeling in the brake operation can be made favorable.

(2) The cylinder device according to the form (1),
wherein the cylinder device includes, in the bottom of the blind hole of the pressurizing piston, (a) an auxiliary piston which defines the inter-piston chamber together with the input piston and (b) a spring which elastically supports the auxiliary piston, and
wherein the cylinder device is configured such that the elastic-force dependent pressurizing mechanism includes the auxiliary piston and the spring, and such that, in the communication state, the input piston comes into abutting contact with the pressurizing piston via the auxiliary piston.

(3) The cylinder device according to the form (1),
wherein the cylinder device includes:
an auxiliary piston which is disposed between an outer face of the main body portion of the pressurizing piston and an inner face of the housing and which defines a front side of the opposing chamber; and
a spring which elastically supports the auxiliary piston, and
wherein the cylinder device is configured such that the elastic-force dependent pressurizing mechanism includes the auxiliary piston and the spring.

(4) The cylinder device according to the form (1),
wherein the cylinder device includes:
a first auxiliary piston which is disposed in the bottom of the blind hole and which defines the inter-piston chamber together with the input piston;
a first spring which elastically supports the first auxiliary piston;
a second auxiliary piston which is disposed between an outer face of the main body portion of the pressurizing piston and an inner face of the housing and which defines a front side of the opposing chamber; and
a second spring which elastically supports the second auxiliary piston, and
wherein the cylinder device is configured such that the elastic-force dependent pressurizing mechanism includes the first auxiliary piston, the first spring, the second auxiliary piston and the second spring, and such that, in the communication state, the input piston comes into abutting contact with the pressurizing piston via the first auxiliary piston.

The above three forms are forms in which, relating to a concrete structure of the elastic-force dependent pressurizing mechanism, a limitation is added. The above three forms are, in short, forms in which the elastic-force dependent pressurizing mechanism pressurizes the reaction force chamber from a side of at least one of the housing and the pressurizing piston. In other words, each of the elastic-force dependent pressurizing mechanisms adopted in the above three forms is configured such that the spring of the mechanism is supported by at least one of the housing and the pressurizing piston. Each of the above cylinder devices according to the three forms is considered a device in which the stroke simulator is disposed in the housing.

Moreover, in the cylinder device according to the form in which the cylinder device includes the first spring and the second spring, it is possible to dispose two springs not such that two springs line up in a direction of the input piston moving forward and backward but such that the second spring contains the first spring in that direction. That enables a length of the cylinder device to be shorter in that direction.

(5) The cylinder device according to the form (4),
wherein the elastic-force dependent pressurizing mechanism is configured such that one of a pressurizing force of the first spring and a pressurizing force of the second spring does not increase, when the input piston is moved forward in the not-communication state and an amount of the forward movement thereof goes beyond a predetermined amount.

(6) The cylinder device according to the form (5),
wherein the elastic-force dependent pressurizing mechanism is configured such that, with respect to an amount of the forward and rearward movement of the input piston in the not-communication state, a change amount of the pressurizing force of the first spring and a change amount of the pressurizing force of the second spring are different from each other.

The above two forms are forms in which, where the elastic-force dependent pressurizing mechanism includes two springs, a limitation relating to functions of the two springs is added. According to the above two forms, the elastic-force dependent pressurizing mechanism can be configured such that, in a stage in which a brake operation is initiated, both the two springs are permitted to be elastically deformed and, in a stage in which a brake operation is proceeded beyond some degree, one of the two springs is prohibited from being elastically deformed. Defining a change of the operation reaction force with respect to a change of the operation amount as an operation-reaction-force inclination, it is possible to realize the stroke simulator with an operation reaction force characteristics that the operation-reaction-force inclination is small in the stage in which a brake operation is initiated and becomes large in the stage in which a brake operation is proceeded to some degree.

The latter one of the above two forms is, in short, the form in which the two springs are different in their spring constants. According to the form, a difference between the operation-reaction-force inclination in the stage in which a brake operation is initiated and the operation-reaction-force inclination in the stage in which a brake operation is proceeded to some degree can be arbitrarily varied by arbitrarily setting a difference between spring constants of the two springs. For instance, the difference of the operation-reaction-force inclinations in the two stages can be made larger by setting the spring constant of the one of the two springs in which elastic deformation is prohibited in the stage in which a brake operation is proceeded to some degree smaller than the spring constant of the other of the two springs.

(7) The cylinder device according to any one of the forms (2)-(6),
wherein the communication-state switching mechanism includes a passage for the communication between the operation-reaction-force chamber and the reservoir, and an open/close valve which is provided in the passage and which opens or closes the passage.

(8) The cylinder device according to any one of the forms (2)-(6),
wherein the communication-state switching mechanism includes a passage for the communication between the operation-reaction-force chamber and the reservoir, and a relief valve which opens only when a pressure of the operation-reaction-force chamber exceeds a predetermined pressure.

The above two forms are forms in which a limitation relating to a construction of the communication-state switching mechanism is added. The open/close valve of the former form may be an open/close valve such as a normal-open electromagnetic open/close valve, that is, an open/close valve which is put in an open state in a not-energized state and in a close state in an energized state. Where such an open/close valve is employed, the communication state or the not-communication state is selectively realized in accordance with whether electricity is supplied to a hydraulic brake system or not. In addition, according to the cylinder device employing such an electromagnetic open/close valve, in the failure condition etc., the operation reaction force by the elastic-force dependent pressurizing mechanism does not generate from the stage in which a brake operation is initiated, whereby a resistance caused by the operation reaction force can be eliminated. In other words, it can decrease a loss caused by that the operation force is utilized for other than pressurizing by the pressurizing piston. On the other hand, in the latter form, the communication state is realized when the operation force more than a certain degree is applied in the condition that electricity is not supplied. Generally speaking, because a relief valve is more inexpensive than an electromagnetic open/close valve, the latter form realizes a more inexpensive cylinder device.

(9) The cylinder device according to the form (1), wherein the input piston includes a main body member which has a shape like a tube, a front end member which closes a front end portion of the main body member such that an internal chamber is defined inside of the main body member and which is allowed to project from and retract into the main body member, and a spring which is disposed in the internal chamber and which biases the front end member in a direction in which the front end member projects, wherein the elastic-force dependent pressurizing mechanism includes the spring, and wherein the cylinder device is configured such that, in the communication state, the front end portion of the main body member of the input piston comes into abutting contact the pressurizing piston.

This form is a form in which a limitation relating to a construction of the elastic-force dependent pressurizing mechanism is added. While the elastic-force dependent pressurizing mechanism employed in the cylinder device described in the above forms pressurizes the operation-reaction-force chamber from the side of at least one of the housing and the pressurizing piston, the elastic-force dependent pressurizing mechanism employed in the cylinder device according to this form has a spring disposed in the input piston and is configured to pressurize the operation-reaction-force chamber from a side of the input piston. In other words, this form can be considered a form in which a stroke simulator is disposed in the input piston.

(10) The cylinder device according to the form (9), wherein the input piston includes:

two springs each of which functions as the spring, one end portion of one of which is supported by one of the main body member and the front end member, and one end portion of the other of which is supported by the other of the main body member and the front end member, which are disposed in a line, and spring constants of which are different from each other; and a floating sheet which is floatingly supported by the two springs so as to be sandwiched between the other end portion of the one of the two springs and the other end portion of the other of the two springs, and which connects the two springs so as to apply elastic forces of the two springs on the front end member, and wherein the elastic-force dependent pressurizing mechanism includes the two spring and the floating seat.

(11) The cylinder device according to the form (10), wherein the cylinder device is configured such that a displacement of the floating seat relative to one of the main body member and the front end member is prohibited so as not to increase an amount of elastic deformation of one of the two springs, where, in a process of retraction of the front end member relative to the main body member, an amount of the retraction exceeds a predetermined amount.

The above two forms are forms in which the elastic-force dependent pressurizing mechanism includes the two spring. As described above, according to the latter form, the elastic-force dependent pressurizing mechanism can be configured such that, in the stage in which a brake operation is initiated, both the two springs are permitted to be elastically deformed and, in the stage in which a brake operation is proceeded beyond some degree, one of the two springs is prohibited from being elastically deformed. Therefore, it is possible to realize the stroke simulator with the operation reaction force characteristics that the operation-reaction-force inclination is small in the stage in which a brake operation is initiated and becomes large in the stage in which a brake operation is proceeded to some degree. In addition, a difference between the operation-reaction-force inclination in the stage in which a brake operation is initiated and the operation-reaction-force inclination in the stage in which a brake operation is proceeded to some degree can be arbitrarily varied by arbitrarily setting a difference between spring constants of the two springs. The difference of the operation-reaction-force inclinations in the two stages can be made larger by setting the spring constant of the one spring in which elastic deformation is prohibited in the stage in which a brake operation is proceeded to some degree smaller than the spring constant of the other spring.

(12) The cylinder device according to any one of the forms (9)-(11), wherein the communication-state switching mechanism includes a passage for the communication between the operation-reaction-force chamber and the reservoir, and an open/close valve which is provided in the passage and which opens or closes the passage.

(13) The cylinder device according to any one of the forms (9)-(11), wherein the communication-state switching mechanism includes a passage for the communication between the operation-reaction-force chamber and the reservoir, and a relief valve which opens only when a pressure of the operation-reaction-force chamber exceeds a predetermined pressure.

The above two forms are forms in which a limitation relating to a composition of the communication-state switching mechanism is added. As described above, the open/close valve of the former form may be, for example, a normal-open electromagnetic open/close valve. If such an open/close valve is employed, the communication state or the not-communication state is selectively realized in accordance with whether electricity is supplied to a hydraulic brake system or not. In addition, according to the cylinder device employing such an electromagnetic open/close valve, as explained above, in a failure condition etc., it is possible to decrease a loss which is caused by that the operation force is utilized for other than pressurizing by the pressurizing piston. On the other hand, according to the latter form, as explained above, the communication state is realized in the case of no supply of electricity, when the operation force more than a certain degree is applied. However, a more inexpensive cylinder device is realized.

(14) The cylinder device according to the form (13), wherein the cylinder device includes an open/close valve which is provided in the front end member of the input piston and which is opened by engaging with an engage portion provided on a bottom portion of the blind hole of the pressurizing piston when the front end member comes close to the bottom of the blind hole within a predetermined distance, and wherein the cylinder device is configured such that the operation-reaction-force chamber and the reservoir communicate with each other via the internal chamber of the input piston by opening of the open/close valve.

According to the above form, in the case that the above relief valve opens and a decrease of the volume of the inter-piston chamber is permitted, in short, in the case that free movement of the input piston relative to the pressurizing piston is permitted, where the front end of the input piston moves beyond a predetermined distance to come close to the bottom of the blind hole, the communication state is realized. Even when the communication state is realized by the above relief valve in the failure condition etc., the operation reaction force corresponding to an opening pressure of the relief valve is applied to the operation member. In the cylinder device of this form, because the communication state due to the opening of the above open/close valve is realized in a state in which the input piston moves forward to some degree, the operation reaction force due to a remaining pressure in the reaction force chamber is not generated after the opening of the above open/close valve, thereby decreasing a loss which is caused by that the operation force is utilized for other than pressurizing by the pressurizing piston.

(15) The cylinder device according to any one of the forms (1)-(14), wherein, where the pressurizing piston is a first pressurizing piston, the cylinder device further comprises a second pressurizing piston which is disposed in the housing and in front of the first pressurizing piston such that a second pressurizing chamber is defined in front of the second pressurizing piston, and such that a first pressurizing chamber as the pressurizing chamber is defined behind the second pressurizing piston and between the second pressurizing piston and the first pressurizing piston.

The cylinder device according to this form is a cylinder device having two pressurizing pistons and two pressurizing chambers. Such a cylinder device is relatively long in the direction of pressurizing of the pressurizing piston, that is, in the direction of the input piston moving forward and backward. Therefore a merit of compactness by not disposing the stroke simulator outside of the cylinder device is advantageously applied to the cylinder device having two pressurizing pistons and two pressurizing chambers.

BEST MODE FOR CARRYING OUT THE INVENTION

There will be described in detail some embodiments according to the claimable invention with reference to the drawings. It is to be understood, however, that the claimable invention is not limited to the following embodiments and modified embodiments but may be embodied with various changes and modifications on the basis of knowledge of those skilled in the art.

First Embodiment

<<Configuration of Vehicle>>

Figure 1:
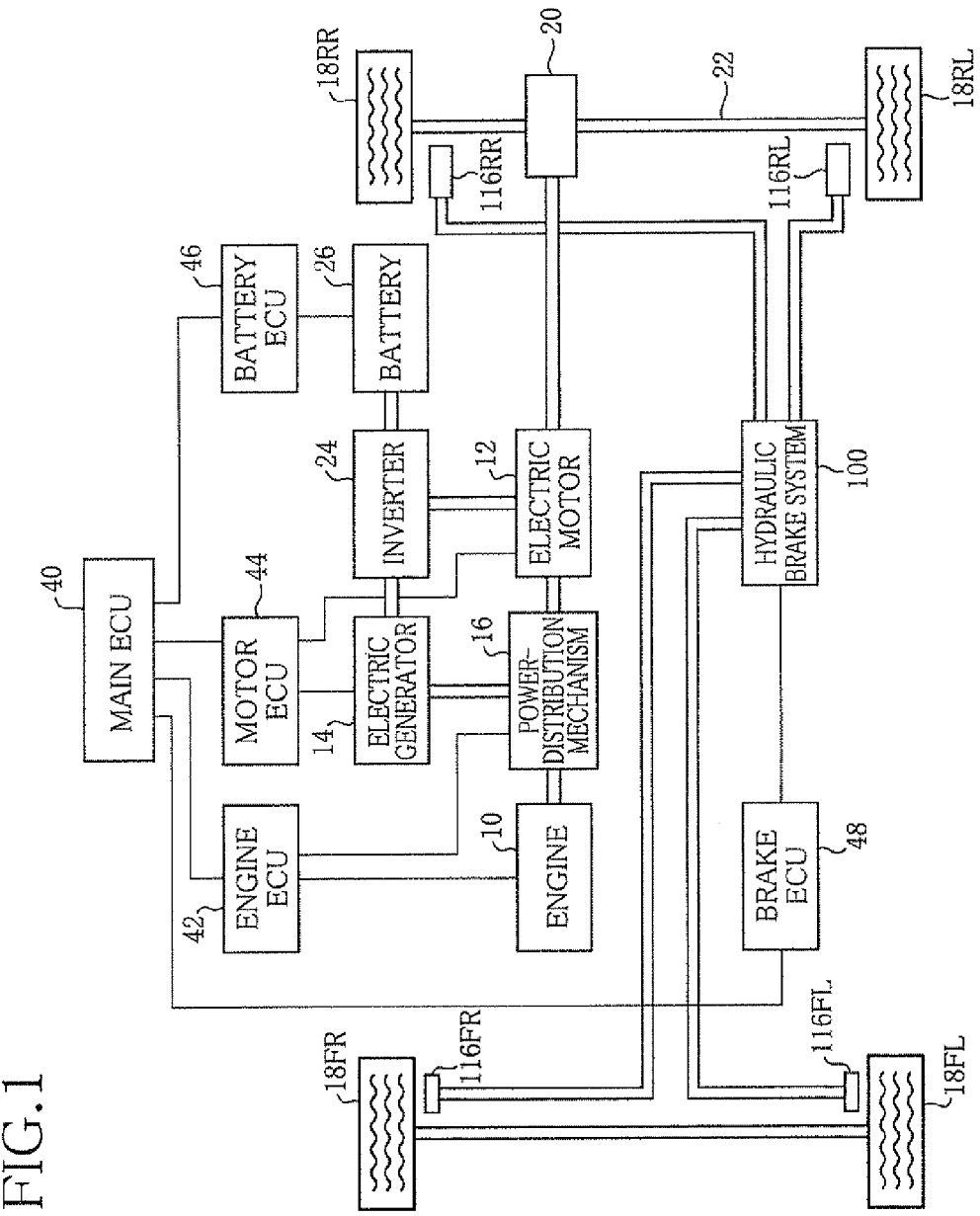
FIG. 1 is a schematic view of a drive system and a brake system of a hybrid vehicle equipped with a cylinder device according to an embodiment of the claimable invention.

FIG. 1 schematically illustrates a drive system and a brake system of a hybrid vehicle which is equipped with a cylinder device of a first embodiment. The vehicle is equipped with an engine 10 and an electric motor 12 as sources of power and an electric generator 14 which generates electricity by an output power of the engine 10. The engine 10, the electric motor 12, and the electric generator 14 are connected with one another by a power-distribution mechanism 16. By controlling the power-distribution mechanism 16, the power of the engine 10 is divided into a power for driving the electric generator 14 and a power for rotating drive wheels among four wheels 18, and the power of the electric motor 12 is transmitted to the drive wheels. In other words, the power-distribution mechanism 16 functions as a speed-change mechanism with respect to a driving power which is transmitted to the drive wheels 18 via a speed reducer 20 and a drive shaft 22. While some of component elements such as the wheels 18 are collectively described, a suitable one of suffixes "FL", "FR", "RL", "RR" respectively indicative of a front left wheel, a front right wheel, a rear left wheel, and a rear right wheel is attached to the numerals of a component element where it is needed to indicate to which one of the four wheels the component element corresponds. According to the description of the suffixes, the drive wheels of the vehicle are the wheel 18RL and the wheel 18 RR.

The electric motor 12 is an alternating current (AC) synchronous motor and is driven by AC electricity. The vehicle is equipped with an inverter 24 which can change electricity of direct current to electricity of alternating current and vice versa. Therefore, by controlling the inverter 24, electricity of alternating current generated by the electric generator 14 is changed into electricity of direct current which is charged in a battery 26, and electricity of direct current charged in the battery 26 is changed into electricity of alternating current for driving the electric motor 12. The electric generator 14 is configured as an AC synchronous motor like the electric motor 12. Accordingly, it may be considered that the vehicle with the present embodiment has two AC synchronous motors. One of them is the electric motor 12 used to mainly output the driving power and the other of them is the electric generator 14 used to mainly generate electricity using the output power of the engine 10.

The electric motor 12 can also generate (regenerate) electricity by utilizing rotations of the wheels 18RL and 18RR in the vehicle running. In regenerating electricity, the electric motor 12 connected to the wheels 18RL and 18RR generates a resistance force for restraining a rotation of the electric motor 12 while generating electricity. Therefore, it is possible to utilize the resistance force as a brake force to brake the vehicle. That is, the electric motor 12 is utilized as a means of a regenerative brake which brakes the vehicle with regenerating electricity. Thus, the vehicle is braked by controlling the regenerative brake together with an engine brake and a hydraulic brake described below. On the other hand, the electric generator 14 generates electricity mainly with the output power of the engine 10 and also functions as an electric motor which runs by electricity supplied from the battery 26 via the inverter 24.

In the vehicle, the above controls of the brakes and other controls in the vehicle are executed by a plurality of electronic control units (ECU). Among a plurality of ECUs, a main ECU 40 has a function for supervising the executions of these controls. For instance, the hybrid vehicle can run by a drive of the engine 10 and a drive of the electric motor 12 which are synthetically controlled by the main ECU 40. More specifically, the main ECU 40 determines a ratio between the output power of the engine 10 and the output power of the electric motor 12, and on the basis of the ratio, the main ECU 40 sends to an engine ECU 42 which controls the engine 10 and a motor ECU 44 which controls the electric motor 12 and the electric generator 14, commands regarding their controls.

A battery ECU 46 controlling the battery 26 is also connected to the main ECU 40. The battery ECU 46 monitors a state of an electric charge of the battery 26, and sends a charge-request command to the main ECU 40 when the electric charge is short. When the main ECU 40 receives the charge-request command, the main ECU 40 sends, to the motor ECU 44, a command that the electric generator 14 generates electricity so as to charge the battery 26.

A brake ECU 48 is also connected to the main ECU 40. The vehicle is equipped with a brake operating member (hereinafter, referred to as an "operating member" where appropriate) which is operated by the driver. The brake ECU 48 determines a target brake force on the basis of at least one of a brake operation amount (hereinafter, referred to as an "operation amount" where appropriate) which is an amount of operation of the operating member and a brake operation force (hereinafter, referred to as an "operation force" where appropriate) which is a force that is applied to the operating member by the driver, and sends the target brake force to the motor ECU 44. The motor ECU 44 controls the regenerative brake on the basis of the target brake force and sends, to the main ECU 40, an executed value, that is, a value of the regenerative brake force which is being generated. In the main ECU 40, the regenerative brake force is subtracted from the target brake force, and a target hydraulic brake force which should be generated in a hydraulic brake system 100 mounted on the vehicle is determined on the basis of the subtracted value. The main ECU 40 sends the target hydraulic brake force to the brake ECU 48, and then, the brake ECU 48 controls the hydraulic brake system 100 such that a hydraulic brake force which is generated by the hydraulic brake system 100 becomes equal to the target hydraulic brake force.

<<Configuration of Hydraulic Brake System>>

The hydraulic brake system 100 provided in the hybrid vehicle configured as described above will be explained with reference to FIG. 2. In the following description, the terms "forward" and "rearward" are used to indicate the leftward direction and the rightward direction in FIG. 2, respectively. In addition, the terms "front side", "front end", "forward movement", "rear side", "rear end", "rearward movement", etc. are similarly used. Incidentally, in the following explanation, characters enclosed in square brackets [ ] represent sensors etc. in the drawings.

Figure 2:
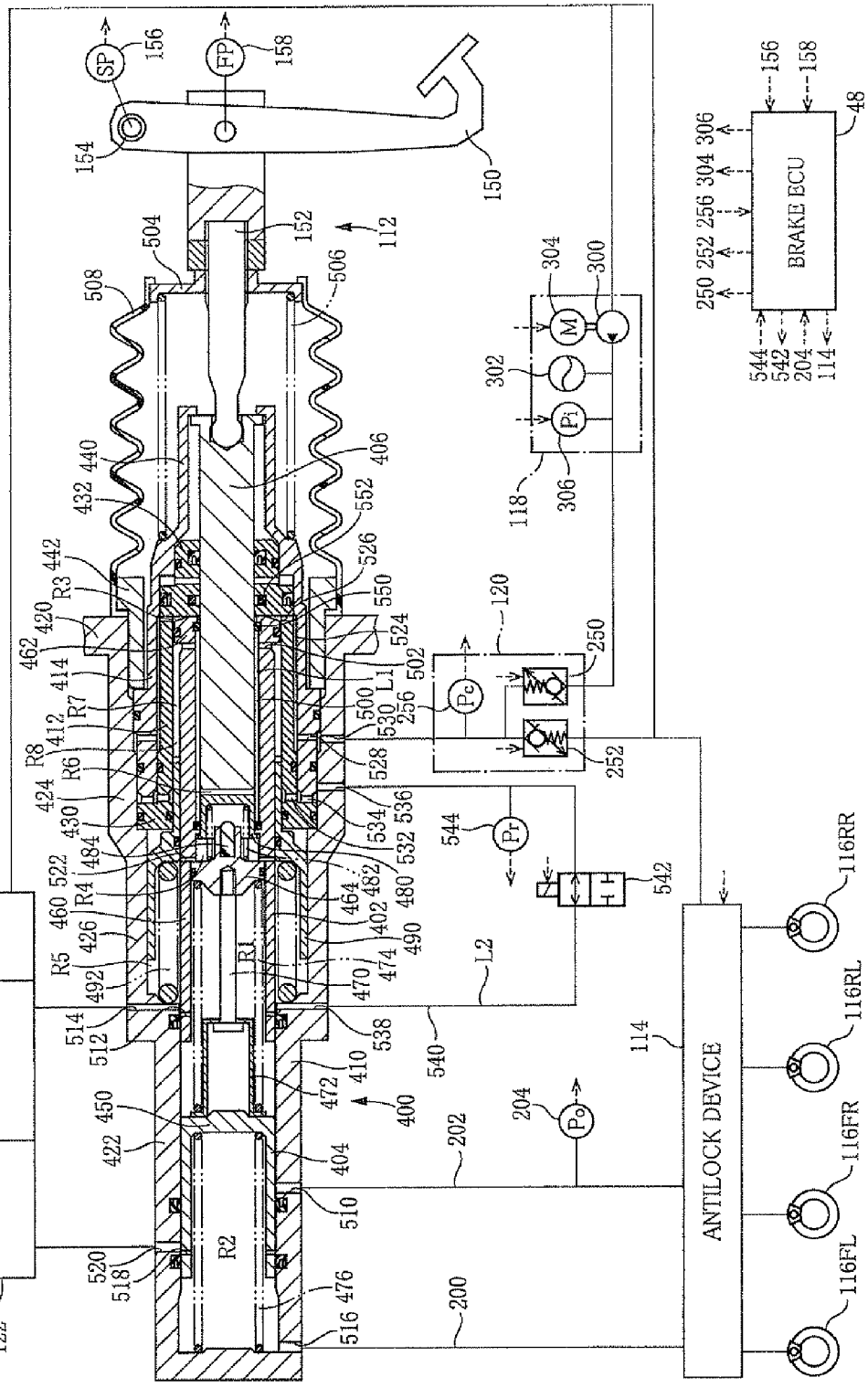
FIG. 2 is a view of a hydraulic brake system including a cylinder device according to the first embodiment.

FIG. 2 schematically represents the hydraulic brake system 100 provided in the vehicle. The hydraulic brake system 100 has a cylinder device 110 for pressurizing the brake fluid. The driver in the vehicle can actuate the cylinder device 110 by operating an operating device 112 which is connected to the cylinder device 110. The cylinder device 110 pressurizes the brake fluid by its actuation. The pressurized brake fluid is supplied to each of brake devices 116 respectively provided for the wheels via an antilock device 114 which is connected to the cylinder device 110. The brake devices 116 respectively generate forces which restrains the rotations of the wheels 18, namely, hydraulic brake forces depending on a pressure of the pressurized brake fluid (hereinafter, referred to as an "output pressure" where appropriate).

The hydraulic brake system 100 has an external high-pressure-source device 118 for intensifying the pressure of the brake fluid. The external high-pressure-source device 118 is connected to the cylinder device 110 via a pressure-intensifying/reducing device 120. The pressure-intensifying/reducing device 120 is a device which controls the pressure of the brake fluid intensified by the external high-pressure-source device 118 and which intensifies and reduces the pressure of the brake fluid that is inputted to the cylinder device 110 (hereinafter, referred to as an "input pressure" where appropriate). The cylinder device 110 is configured to operate according to intensification and reduction of the input pressure. The hydraulic brake system 100 also has a reservoir 122 which stores the brake fluid under the atmospheric pressure. The reservoir 122 is connected to each of the cylinder device 110, the pressure-intensifying/reducing device 120, and the external high-pressure-source device 118.

The operating device 112 includes a brake pedal 150 as an operating member and an operation rod 152 connected to the brake pedal 150. The brake pedal 150 is pivotally held on the body of the vehicle. The operation rod 152 is connected at a rear end portion thereof to the brake pedal 150 and at a front end portion thereof to the cylinder device 110. The operation device 112 has an operation amount sensor [SP] 156 for detecting the operation amount of the brake pedal 150 and an operation force sensor [FP] 158 for detecting the operation force. The operation amount sensor 156 and the operation force sensor 158 are connected to the brake ECU 48. The brake ECU 48 determines the target brake force on the basis of values detected by the sensors.

The brake devices 116 are connected to the cylinder device 110 via fluid passages 200, 202. The fluid passages 200, 202 are fluid passages for supplying, to the brake devices 116, the brake fluid which is pressurized to the output pressure by the cylinder device 110. An output pressure sensor [$P_O$] 204 is provided on the fluid passage 202. Though detailed description about the brake devices 116 is abbreviated, each of them includes a brake caliper, a wheel cylinder (brake cylinder) provided in the brake caliper, a pair of brake pads, and a brake disc which rotates together with the corresponding wheel. Each of the fluid passages 200, 202 is connected to the brake cylinder of the corresponding brake device 116 via the antilock device 114. More specifically, the fluid passage 200 is connected to the brake devices 116FL, 116FR for the front wheels and the fluid passage 202 is connected to the brake devices 116RL, 116RR for the rear wheels. The brake cylinders press the brake pads onto the brake disks on the basis of the output pressure of the brake fluid pressurized by the cylinder device 110. Friction generated by that press generates the hydraulic brake force, and, in each of the brake devices 116, the rotation of the corresponding wheel is restrained by the press. Thus, the vehicle is braked.

The antilock device 114 is a common device and, in short, has four pairs of open/close valves respectively corresponding to the wheels. One of a pair of open/close valves is an open/close valve for pressurizing the brake fluid and is put in an open state when the wheel is not locked, and the other of them is an open/close valve for depressurizing the brake fluid and is put in a close state when the wheel is not locked. The antilock device 114 is configured such that, in order to release the lock of the wheel, the open/close valve for pressurizing the brake fluid shuts off a flow of the brake fluid from the cylinder device 110 to the brake device 116 and the open/ close valve for depressurizing the brake fluid permits a flow of the brake fluid from the brake device 116 to the reservoir, when the wheel is locked.

The external high-pressure-source device 118 is provided on a fluid passage extending from the reservoir 122 to the pressure-intensifying/reducing device 120. The high-pressure-source device 118 includes a hydraulic pump 300 which intensifies the pressure of the brake fluid and an accumulator 302 which stores the brake fluid whose pressure is intensified. Incidentally, the hydraulic pump 300 is driven by a motor 304. The high-pressure-source device 118 has a high-pressure-source pressure sensor $[P_H]$ 306 for detecting the high-pressure-source pressure described above. The brake ECU 48 monitors a value detected by the high-pressure-source pressure sensor 306, and the hydraulic pump 300 is controlled to be driven on the basis of the detected value, whereby the high-pressure-source device 118 constantly supplies, to the pressure-intensifying/reducing device 120, the brake fluid having a pressure not lower than a predetermined pressure.

The pressure-intensifying/reducing device 120 includes an electromagnetic pressure-intensifying linear valve 250 which intensifies the controlled high-pressure-source pressure and an electromagnetic pressure-reducing linear valve 252 which reduces the controlled high-pressure-source pressure. The pressure-intensifying linear valve 250 is provided on a fluid passage extending from the high-pressure-source device 118 to the cylinder device 110 while the pressure-reducing linear valve 252 is provided on a fluid passage extending from the reservoir 122 to the cylinder device 110. Incidentally, the fluid passages respectively extending from the pressure-intensifying linear valve 250 and the pressure-reducing linear valve 252 are integrated into a single fluid passage that is connected to the cylinder device 110. In addition, an input pressure sensor $[P_C]$ 256 for detecting the input pressure is provided on the integrated fluid passage. The brake ECU 48 controls the pressure-intensifying/reducing device 120 on the basis of a value detected by the input pressure sensor 256.

The pressure-intensifying linear valve 250 is kept in a close state when electric current is not supplied thereto, that is, a coil of the pressure-intensifying linear valve 250 is not energized. When electric current is supplied to the pressure-intensifying linear valve 250, that is, the coil of the pressure-intensifying linear valve 250 is energized, the valve 250 opens at a valve-opening pressure which is determined in accordance with the supplied electric current. Incidentally, the pressure-intensifying linear valve 250 is configured such that the larger the supplied electric current is, the higher the valve-opening pressure is. On the other hand, the pressure-reducing linear valve 252 is kept in an opened state when electric current is not supplied thereto. In a normal condition, that is, a condition in which electric current can be supplied to the system, the pressure-reducing linear valve 252 is put in a close state by a supply of the maximum electric current in a predetermined range. When the electric current supplied to the pressure-reducing linear valve 252 is decreased, the pressure-reducing linear valve 252 opens at a valve-opening pressure which is determined in accordance with the supplied electric current. Incidentally, the pressure-reducing linear valve 252 is configured such that the smaller the supplied electric current is, the lower the valve-opening pressure is.

<<Construction of Cylinder Device>>

As shown in FIG. 2, the cylinder device 110 includes a housing 400 which is a casing of the cylinder device 110, a first pressurizing piston 402 and a second pressurizing piston 404 which pressurize the brake fluid to be supplied to the brake devices 116, and an input piston 406 to which the operation of the driver is inputted via the operating device 112. Incidentally, FIG. 2 illustrates a state in which the cylinder device 110 is not actuated, that is, the operation of the brake is not performed. Like common cylinder devices, the cylinder device 110 is configured such that, inside the cylinder device 110, there are formed several fluid chambers which accommodate the brake fluid and several fluid passages which connect one chamber to another chamber or exteriors. There are disposed several seals between components of the cylinder device 110 so as to secure hermetical closeness of the fluid chambers and the fluid passages. Because these seals are common products, in the interest of brief description of the specification, explanation of the seals is dispensed with unless needed.

The housing 400 is constituted mainly by three members, concretely, a first housing member 410, a second housing member 412, and a third housing member 414. The first housing member 410 has a shape like a tube, on the whole, whose front end portion is closed and has a flange 420 formed on a circumference of a rear end portion thereof. The first housing member 410 is mounted on the body of the vehicle at the flange 420. The first housing member 410 is sectioned into three portions having mutually different inner diameters, concretely, a front small-diameter portion 422 located in a front side and having the smallest inner diameter, a rear large-diameter portion 424 located in a rear side and having the largest inner diameter, and an intermediate portion 426 located between the front portion 422 and the rear portion 424 and having a diameter intermediate between the diameter of the front small-diameter portion 422 and the diameter of the rear large-diameter portion 424.

The second housing member 412 has a shape like a tube which has a flange portion 430 at a front end portion and has a rear end portion 432 whose diameter is small. The second housing member 412 is fitted into the rear large-diameter portion 424 of the first housing member 410 such that a front end of the flange portion 430 is in contact with a stepping face which is formed between the intermediate portion 426 and the rear large-diameter portion 424 of the first housing member 410. The third housing member 414 has a shape like a tube whose portion located in a rear side is a small-diameter portion 440. The third housing member 414 is fitted between an inner face of the rear large-diameter portion 424 and an outer face of the second housing member 412, and thus the small-diameter portion 440 located in the rear side projects backward from a rear end of the first housing member 410. The first housing member 410, the second housing member 412, and the third housing member 414 are fastened with each other by a lock ring 442 which is screwed on a rear end portion of the first housing portion 410.

The second pressurizing piston 404 has a shape like a tube whose rear end portion 450 is closed, and is slidably fitted into the front small-diameter portion 422 of the first housing member 410. The first pressurizing piston 402 is shaped such that it has a body portion 460 having a shape like a tube and has a flange portion 462 provided on a rear end portion of the body portion 460. The first pressurizing piston 402 is disposed behind the second pressurizing piston 404. A front portion of the body portion 460 is slidably fitted into a rear end portion of an inner face of the front small-diameter portion 422 of the first housing member 410 and the flange portion 462 is slidably fitted into an inner face of the second housing member 412. An inside of the body portion 460 of the first pressurizing piston 402 is sectioned into two portions by a separation wall 464 which is fitted and fixed in the middle of the body portion 460 in a forward-rearward direction thereof.

That is, the first pressurizing piston 402 is shaped such that it has two blind holes whose openings are on a front end and a rear end thereof, respectively.

Between the first pressurizing piston 402 and the second pressurizing piston 404, there is defined a first pressurizing chamber R1 for pressurizing the brake fluid which is supplied to the brake devices 116RL, RR provided for the two rear wheels, respectively, and in front of the second pressurizing piston 404, there is defined a second pressurizing chamber R2 for pressurizing the brake fluid which is supplied to the brake devices 116FL, FR provided for the two front wheels, respectively. In addition, a distance that the first pressurizing piston 402 and the second pressurizing piston 404 separate from each other is limited so as to be within a predetermined range by a headed pin 470 screwed on the separation wall 464 of the first pressurizing piston 402 to extend forward and a pin-retaining tube 472 fixed on a rear end face of the second pressurizing piston 404. In the first pressurizing chamber R1 and the second pressurizing chamber R2, compression coil springs (hereinafter, referred to as a "return springs" where appropriate) 474, 476 are disposed, respectively. Those springs bias the first pressurizing piston 402 and the second pressurizing piston 404 in directions that the pistons 402, 404 separate away from each other and bias the second pressurizing piston 404 rearward.

Behind the first pressurizing piston 402, specifically, behind the flange portion 462 of the first pressurizing piston 402 and between the flange portion 462 and an rear end portion of the second housing member 412, there is defined a fluid chamber R3 into which the brake fluid is supplied from the high-pressure-source device 118, that is, the pressure from the high-pressure-source device 118 is inputted. It is noted that the first input chamber R3 is illustrated in an almost squeezed state in FIG. 2.

A first auxiliary piston 480 is disposed behind the separation wall 464 in the first pressurizing piston 402. This first auxiliary piston 480 has a shape like a tube whose rear end is closed and is biased backward by a compression coil spring (hereinafter, referred to as a "first reaction force spring" where appropriate) 482 which is disposed between the first auxiliary piston 480 and the separation wall 464. That is, the first reaction force spring 482 is configured as what elastically supports the first auxiliary piston 480. It is noted that, between the separation wall 464 and the first auxiliary piston 480, there is defined a space as a liquid chamber R4 which is always at an atmospheric pressure (hereinafter, referred to as a "first atmospheric pressure chamber" where appropriate). Additionally, backward movement of the first auxiliary piston 480 is limited in a predetermined range by a step which is formed inside of the first pressurizing chamber 402 and forward movement of the first auxiliary piston 480 is limited in a predetermined range by a cushion rubber 484 which is fixed on a rear face of the separation wall 464.

On the other hand, a second auxiliary piston 490 is fitted on an outside of the first pressurizing piston 402. The second auxiliary piston 490 has a shape like a tube having a step whose rear portion has a small diameter and whose front portion has a large diameter. An inner diameter of the second housing member 412 is larger than an outer diameter of the body portion 460 of the first pressurizing piston 402. A rear portion of the second auxiliary piston 490 is disposed such that inserted from the front side into a clearance formed between an inner face of the second housing member 412 and an outer face of the body portion 460 of the first pressurizing piston 402. A front portion of the second auxiliary piston 490 is disposed in a space formed between an inner face of an intermediate portion of the first housing member 410 and an outer face of the body portion 460 of the first pressurizing piston 402. The space is defined as a liquid chamber R5 which is always at the atmospheric pressure (hereinafter, referred to as a "second atmospheric pressure chamber" where appropriate). In the space, there is disposed a compression coil spring (hereinafter, referred to as a "second reaction force spring" where appropriate) 492. The second reaction force spring 492 biases the second auxiliary piston 490 backward. That is, the second reaction force spring 492 is configured as what elastically supports the second auxiliary piston 490.

The input piston 406 is inserted from an rear end of the housing 400 into the housing 400 with slidably contacting with an inner face of a rear end portion of the second housing member 412 and is inserted into inside of the first pressurizing piston 402 with slidably contacting with an inner face of the first pressurizing piston 402. In front of the input piston 406 and between the input piston 406 and the first auxiliary piston 480, there is defined a liquid chamber R6 (hereinafter, referred to as an "inter-piston chamber" where appropriate). As explained above, in the housing 400, there exists the clearance formed between the inner face of the second housing member 412 and the outer face of the body portion 460 of the first pressurizing piston 402. This clearance is defined by a front end face of the flange portion 462 of the first pressurizing piston 402 and a rear end face of the second auxiliary piston 490, thereby forming a ring-shaped chamber. This chamber is an opposing chamber R7 which is opposed to the input chamber R3 with the flange portion 462 interposed therebetween.

The inter-piston chamber R6 and the opposing chamber R7 communicate with each other by a liquid passage 500 and a communication hole 502 which are provided in the first pressurizing piston 402. That is, those liquid passage 500 and communication hole 502 form an inter-chamber communication passage L1. Therefore, the inter-piston chamber R6 and the opposing chamber R7 are configured as a single integrated liquid chamber (hereinafter, referred to as a "reaction force chamber" where appropriate) R8 with the inter-chamber communication passage L1. In accordance with the relative movement of the first pressurizing piston 402 and the input piston 406, a volume of the inter-piston chamber R6 increases and decreases while a volume of the opposing chamber R7 decreases and increases. The above inter-chamber communication passage L1 has a function for that the volume change of one of the fluid chambers absorbs the volume change of the other of the fluid chambers and vice versa. Incidentally, the cross section area of the opposing chamber R7 is approximately equal to that of the inter-piston chamber R6, whereby the first pressurizing piston 402 is allowed to move relative to the housing 400 while the input piston 400 is not allowed to move relative to the housing 400.

A front end portion of the operation rod 152 is connected to a rear end portion of the input piston 406 so as to transmit, to the input piston 406, the operation force applied to the brake pedal 150 and so as to move the input piston 406 forward and rearward in accordance with the operation amount of the brake pedal 150. Incidentally, the rearward movement of the input piston 406 is limited because the rear end portion thereof is stopped by a rear end portion of the small-diameter portion of the third housing member 414. In addition, a spring seat 504 shaped like a disc is fixed to the operation rod 152, and a compression coil spring (hereinafter, referred to as a "return spring" where appropriate) 506 is disposed between the spring seat 504 and the third housing member 414. The return spring 506 biases the operation rod 152 rearward. Incidentally, a boot 508 is provided between the spring seat 504 and the housing 400 so as to protect a rear portion of the cylinder device 110 from dust.

The first pressurizing chamber R1 communicates with the fluid passage 202 connected to the antilock device 114 via a communication hole 510 whose opening is an output port, and communicates with the reservoir 122 via a communication hole 512 provided on the first pressurizing piston 402 and a communication hole 514 whose opening is a drain port while being allowed not to communicate with the reservoir 122. On the other hand, the second pressurizing chamber R2 communicates with the fluid passage 200 connected to the antilock device 114 via a communication hole 516 whose opening is an output port, and communicates with the reservoir 122 via a communication hole 518 provided on the second pressurizing piston 404 and a communication hole 520 whose opening is a drain port while being allowed not to communicate with the reservoir 122. In addition, the first atmospheric pressure chamber R4 and the second atmospheric pressure chamber R5 communicate with each other via a communication hole 522 provided on the first pressurizing chamber 402. The second atmospheric pressure chamber R5 communicates with the communication hole 514 whose opening is a drain port. A portion of the second housing member 412 which is located in a rear side thereof has an outer diameter somewhat smaller than an inner diameter of the third housing member 414. Between the housing members 412 and 414, there is formed a fluid passage 524 having a certain cross section area through which the brake fluid can flow. The input chamber R3 communicates with the pressure-intensifying/reducing device 120 via the communication passage 524, a communication hole 526 provided on the second housing member 412, and a communication hole 530 whose opening is an input port.

In the cylinder device 110, the opposing chamber R7 can communicate with exteriors via a communication hole 532 provided on the second housing member 412, a communication hole 534 provided on the third housing member 414, and a communication hole 536 whose opening is a connection port. Additionally, the second atmospheric pressure chamber R5 can communicate with exteriors via a communication hole 536 whose opening is a connection port. These two connection ports communicate with each other via an external communication passage 540, whereby there is formed a communication passage L2 for a communication between the opposing chamber R7 and the reservoir 122 via the second atmospheric pressure chamber R5. That is, in the cylinder device 110, there is provided the passage for a communication between the reservoir 122 and the reaction force chamber R8 which is formed by the integration of the inter-piston chamber R6 and the opposing chamber R7. Additionally, in the cylinder device 110, on the external communication passage 540, there is provided an open/close valve 542. This open/close valve 542 is an open/close valve which opens in a not-energized state and closes in an energized state. That is, in the cylinder device 110, there is constituted a communication-state switching mechanism which selectively realizes a communication state in which the reaction force chamber R8 and the reservoir 122 communicate with each other by the communication passage 540 for a communication between the reaction force chamber R8 and the reservoir 122 and by the open/close valve 542 provided on the communication passage 540, and an not-communication state in which the reaction force chamber R8 and the reservoir 122 do not communicate with each other. It is noted that, on the external communication passage 540, there is provided a reaction force pressure sensor [Pr] 544 for detecting a reaction force pressure of the reaction force chamber R8.

<<Actuation of Cylinder Device>>

The following explanation is regarding actuations of the cylinder device 110. For the sake of convenience, before an actuation in the normal condition is explained, an actuation in an electrical failure condition, that is, a condition in which the supply of electric current to the hydraulic brake system 100 is cut off is explained. In the electrical failure condition, the pressure-intensifying linear valve 250 and the pressure-reducing linear valve 252 are in the close state and the open state, respectively, and the open/close valve 542 is in the open state.

When the driver starts pressing the brake pedal 150, the input piston 406 starts moving forward. Due to the open state of the open/close valve 542, the reaction force chamber R8, that is, the inter-piston chamber R6 is always at the atmospheric pressure and, due to the open state of the pressure-reducing linear valve 252, the input chamber R3 is always at the atmospheric pressure. Therefore, the input piston 406 moves forward with little resistance, and according to the forward movement of the input piston 406, the volume of the inter-piston chamber R6 decreases and a front end of the input piston 406 comes into abutting contact the first auxiliary piston 480. In accordance with increase of the operation amount of the brake pedal 150, the input piston 406 moves forward with contacting with the first auxiliary piston 480 and comes into abutting contact the first pressurizing piston 402 via the first auxiliary piston 480 with compressing the first reaction force spring 482. To be more specific, a bottom portion of the first auxiliary piston 480 comes into abutting contact the cushion rubber 484 provided on the separation wall 464 and a front end of the first auxiliary piston 480 comes into abutting contact a rear end face of the separation wall 464 of the pressurizing piston with squeezing the cushion rubber 484.

When the above contact is realized, the input piston 406 directly pushes the first pressurizing piston 402. Therefore, the operation force applied to the brake pedal 150 is directly transmitted to the first pressurizing piston 402. Then, the driver can push the first pressurizing piston 402 by the driver's own force. Because of this pushing, the first pressurizing piston 402 moves forward, the communication between the first pressurizing chamber R1 with the reservoir 122 is terminated, and the brake fluid in the first pressurizing chamber R1 is pressurized by the operation force of the driver. In accordance with the pressurization of the first pressurizing chamber R1, the second pressurizing piston 404 also moves forward, the communication between the second pressurizing chamber R2 and the reservoir 122, like the first pressurizing chamber R1, is terminated, and the brake fluid in the second pressurizing chamber R2 is also pressurized. Thus, an operation-force dependent pressurizing state is realized in which the brake fluid in the first pressurizing chamber R1 and the second pressurizing chamber R2 is pressurized by the operation force applied to the brake pedal 150, and a fluid pressure according to the operation force of the driver is inputted to the brake device 116.

When the driver stops the brake operation, that is, the application of the operation force to the brake pedal 150 is released, the first pressurizing piston 402 and the second pressurizing piston 404 are respectively returned to their initial positions (positions illustrated in FIG. 2, that is, positions in a state in which a rear end portion of the first pressurizing piston 402 abuts on the rear end portion of the second housing member 412) by the return springs 474, 476. On the other hand, the input piston 406, together with the operation rod 152, is returned to an initial position (a position illustrated in FIG. 2, that is, a position in which the rear end of the input piston 406 is stopped by a rear end portion of the third housing member 414).

An actuation in the normal condition is explained below. In the normal condition, the open/close valve 542 is in the close state, and the opposing chamber R7 and the reservoir 122 does not communicate with each other. That is, the reaction force chamber R8 constituted by the opposing chamber R7 and the inter-piston chamber R6 is in a state in which it is hermetically closed. In addition, the maximum current is supplied to the pressure-reducing linear valve 252, whereby it is put in the close state. When the brake operation is performed and the input piston 406 is moved forward, different form the above failure condition, the pressure in the reaction force chamber R8 increases. An elastic force of the first reaction force spring 482 is applied to the inter-piston chamber R6 via the first auxiliary piston 480 and an elastic force of the second reaction force spring 492 is applied to the opposing chamber R7 via the second auxiliary piston 490. That is, the elastic forces of the two reaction force springs 490, 492 pressurize the reaction force chamber R8. Then, the force by the pressurization is applied as a resistance force against the forward movement of the input piston 406, that is, an operation reaction force against the operation of the brake pedal 150. The cylinder device 110 having such a construction is equipped with a mechanism including the first reaction force chamber 482, the first auxiliary piston 480, the second reaction force spring 492, and the second auxiliary piston 490, namely, an elastic-force dependent pressurizing mechanism which can pressurize the fluid in the reaction three chamber R8 depending on the elastic forces of the first reaction force spring 482 and the second reaction force spring 492.

Figure 3:
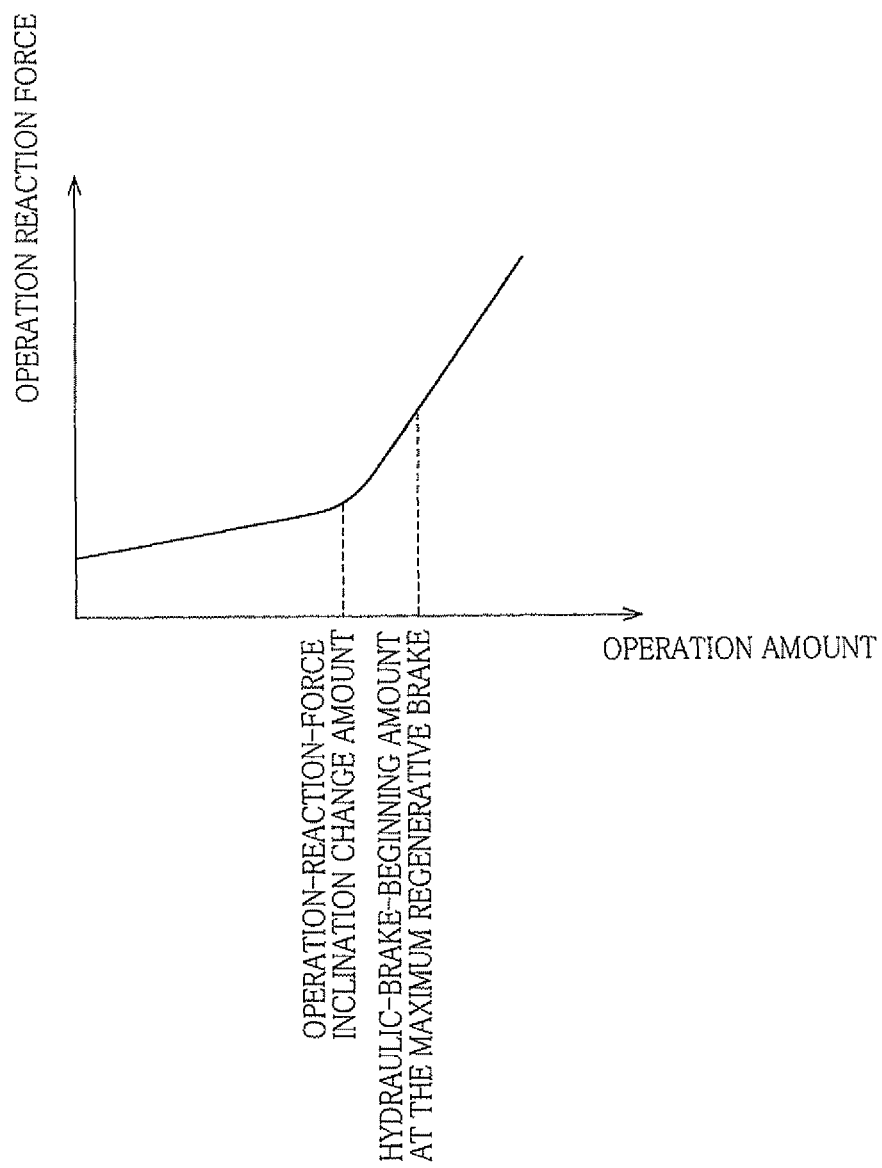
FIG. 3 is a graph which illustrates a relation between an operation amount of an operation member connected to the cylinder device and an operation reaction force applied from the cylinder device to the operation member.

FIG. 3 is a graph which illustrates a change of the operation reaction force with respect to the amount of the forward movement of the input piston 406, namely, the operation amount of the brake pedal 150. Hereinafter, this change is referred to as an "operation reaction force inclination" where appropriate. In other words, FIG. 3 is a graph which describes a characteristic of the cylinder device 110 regarding the operation reaction force. It is understood from the characteristic that, as the operation amount increases, the operation reaction force increases. Where the operation amount of the brake pedal 150 increases beyond a predetermined amount (hereinafter, referred to as an "operation-reaction-force inclination change amount" where appropriate), a change of the operation reaction force with respect to a change of the operation amount becomes large, that is, an increase inclination of the operation reaction force becomes large.

The change of the operation reaction force which has a characteristic shown in FIG. 3 is realized by that a pressurizing force of one of the two reaction force springs is prohibited from increasing where the operation amount of the brake pedal 150 exceeds the operation-reaction-force inclination change amount, in other words, where a distance of the forward movement of the input piston 406 exceeds a predetermined distance. In the cylinder device 110, the first reaction force spring 482 is configured to have a spring constant considerably smaller than that of the second reaction force spring 492. To be more specific, in the range in which the operation amount is relatively small, both of the first reaction force spring 482 and the second reaction force spring 492 are compressed. In contrast, where the operation amount exceeds the operation-reaction-force inclination change amount, the first auxiliary piston 480 comes into abutting contact the separation wall 464 of the first pressurizing piston 402, the first reaction force spring 482 does not elastically deform, and only the second reaction force spring 492 elastically deform.

According to such a mechanism, where the brake pedal 150 is operated beyond the predetermined amount, the increase inclination of the operation reaction force becomes large. Such a characteristic makes operational feeling of the brake pedal 150 more favorable.

Moreover, even though the above brake operation is performed, the volume of the inter-piston chamber R6 does not become zero because the reaction force chamber R8 is hermetically closed. Therefore, a front end of the input piston 406 does not come into abutting contact the first auxiliary piston 480. Additionally, the cross section area of the opposing chamber R7 is approximately equal to that of the inter-piston chamber R6, that is, a pressurized area which is an area of the front end of the flange portion 462 of the first pressurizing piston 402 and to which a pressure of the opposing chamber R7 is applied is approximately equal to a pressurized area which is an area of the front end of the input piston 406 and to which a pressure of the inter-piston chamber R6 is applied. Therefore, the first pressurizing piston 402 is not moved forward only by the above brake operation.

As explained above, in the vehicle, a magnitude of the hydraulic brake force which the hydraulic brake system 100 should generate corresponds to a magnitude obtained by subtracting the regenerative brake force from the target brake force. In an extreme sense, as long as the target brake force can be provided by the regenerative brake force, the hydraulic brake force to be generated by the hydraulic brake system 100 is not required. The cylinder device 110 is configured to generate, in the normal condition, the operation reaction force in accordance with the operation amount of the brake pedal 150 without depending on the generated hydraulic brake force. In an extreme sense, the cylinder device 110 has a function of permitting the operation of the brake pedal 150 in a state in which the brake fluid is not pressurized by the first pressurizing piston 402 and the second pressurizing piston 404. Therefore, the cylinder device 110 has a favorable stroke simulator for the hybrid vehicle.

When the brake fluid in the first pressurizing chamber R1 and the second pressurizing chamber R2 is pressurized by the first pressurizing piston 402 and the second pressurizing piston 404, respectively, so as to generate the hydraulic brake force in the middle of the brake operation, a pressure generated by the high-pressure-source device 118 may be inputted into the input chamber R3. To be more specific, the controlled high-pressure-source pressure controlled by the pressure-intensifying/reducing device 120 may be inputted into the input chamber R3 so as to generate a residual brake force obtained by subtracting the regenerative brake force from the target brake force. Here, a maximum regenerative brake force which can be generated by the regenerative brake of the vehicle is defined as an available-maximum-regenerative brake force. Assuming that the hydraulic brake force is generated after a time point when the target brake force exceeds the available-maximum-regenerative brake force, the operation amount of the brake pedal at the beginning of the generation of the hydraulic brake force is generally equal to a hydraulic-brake-beginning amount at the maximum regenerative brake in FIG. 3. In the hydraulic brake system 100, the hydraulic-brake-beginning amount at the maximum regenerative brake is predetermined to be a slightly larger than the above operation-reaction-force inclination change amount. Incidentally, even though the target brake force does not exceed the available-maximum-regenerative brake force, there is an instance in which the hydraulic brake force is required due to an amount of charge of the battery 26 and so on. In this instance, the pressure from the high-pressure-source device 118 may be inputted into the input chamber R3 before the operation amount reaches the hydraulic-brake-beginning amount at the maximum regenerative brake.

When the pressure is inputted into the input chamber R3, the first pressurizing piston 402 is moved forward by the pressure without depending on the operation force applied to the brake pedal 150 and without depending on the operation amount. Consequently, the brake fluid in the first pressurizing chamber R1 is pressurized. According to that, the brake fluid in the second pressurizing chamber R2 is also pressurized by the second pressurizing piston 404. That is, there is realized a high-pressure-source-pressure dependent pressurizing state in which the brake fluid in the first pressurizing chamber R1 and the second pressurizing chamber R2 is pressurized by the pressure from the high pressure source, irrespective of the forward movement of the input piston 406. The brake force depending on the cylinder device 110, namely, the hydraulic brake force is determined by the pressure of the inputted brake fluid. The input pressure is controlled by the pressure-intensifying/reducing device 120. Accordingly, the pressure controlled at a required degree is inputted into the input chamber R3.

Even in the normal condition, when the operation of the brake is finished, the pressure-reducing linear valve 252 is put in the open state; the first pressurizing piston 402 and the second pressurizing piston 404 are respectively returned to their initial positions by the return springs 474, 476; and the input piston 406 is returned to the initial position by the return spring 506.

<<Features of Hydraulic Brake System>>

In the cylinder device 110, the input piston 406 is inserted in the blind hole provided on the first pressurizing piston 402. Therefore, high pressure seals required to slidably contact with the input piston 406 for defining the liquid chambers are respectively disposed one-by-one between an outer face of the input piston 406 and the inner face of the blind hole of the first pressurizing piston 402 and between the outer face of the input piston 406 and the second housing member 412, respectively. More specifically, they are the seal 550 and the seal 552. Therefore, in the high-pressure-source-pressure dependent pressurizing state, a friction resistance against the movement of the input piston 406 is relatively small, whereby an influence that the friction resistance gives to operational feeling of the operation member, that is, an influence that is given to operational feeling in the brake operation is reduced.

Additionally, in the cylinder device 110, the stroke simulator includes the elastic-force dependent pressurizing mechanism pressurizing the reaction force chamber R8. The first reaction force spring 482 and the second reaction force spring 492 constituting the stroke simulator are disposed inside the cylinder device 110, specifically, inside the housing 400, thereby realizing a compact cylinder device. Moreover, the first reaction force spring 482 and the second reaction force spring 492 are disposed not in a line in the direction of the forward and rearward movement of the input piston but in a state in which the first reaction force spring 482 is put inside of the second reaction force spring 492 in the direction. Consequently, a length of the cylinder device 110 is shortened in the direction.

Furthermore, in the cylinder device 110, one reaction force chamber R8 is formed in a state in which the inter-piston chamber R6 and the opposing chamber R7 communicate with each other, whereby the volume of the inter-piston chamber R6 is set at a relatively small capacity. That is, a distance between the front end of the input piston 406 and the bottom of the blind hole of the first pressurizing piston 402 is set relatively short. Accordingly, a distance is short which is necessary for the input piston 406 to move forward to come into abutting contact with the first pressurizing piston 402, whereby, in the cylinder device 110, a play of the brake operation in the failure condition etc. is small and operational feeling in the brake operation is favorable.

<<Modified Embodiment>>

Figure 4:
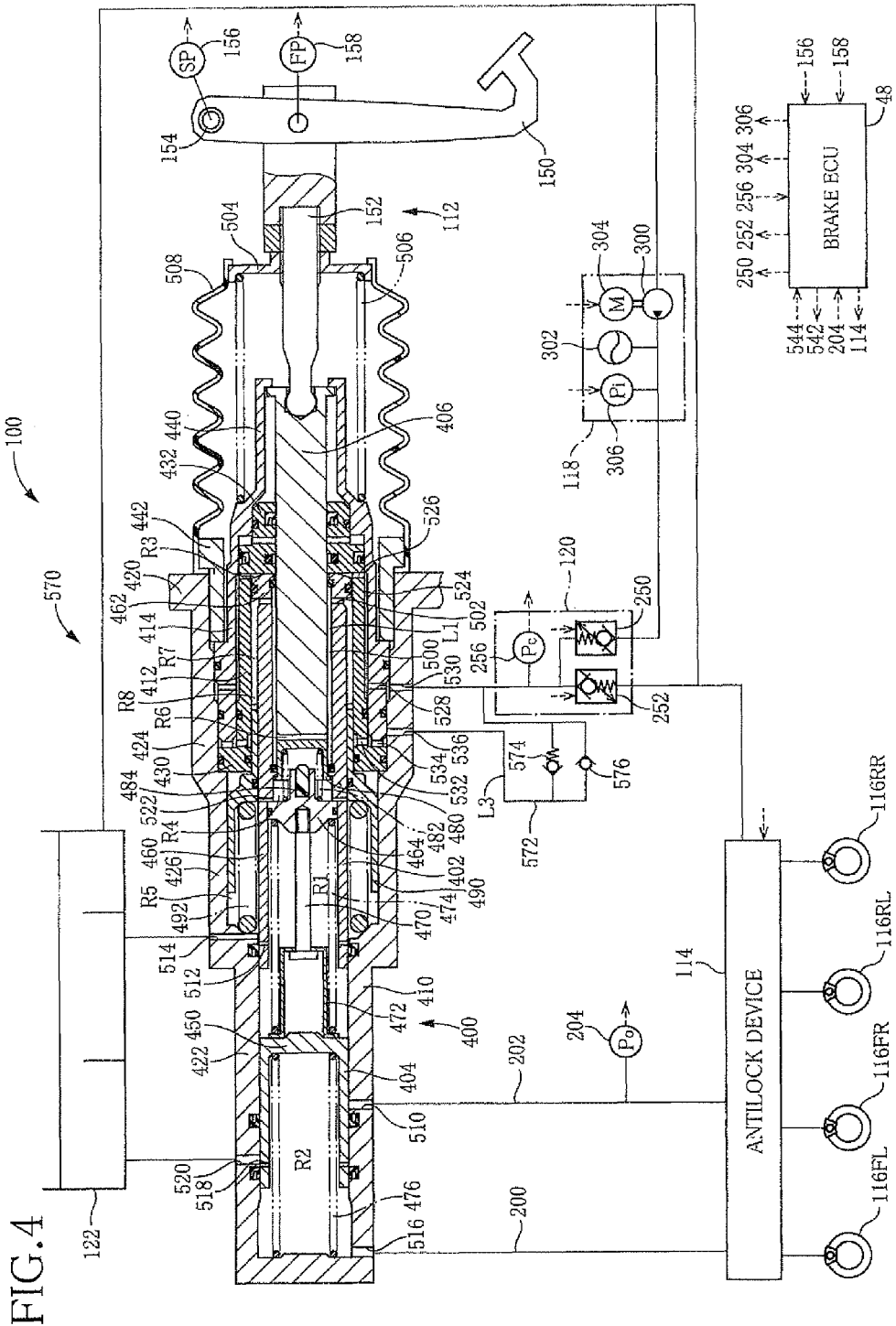
FIG. 4 is a view of a hydraulic brake system including a cylinder device according to a modified embodiment of the first embodiment.

FIG. 4 shows the hydraulic brake system 100 in which a cylinder device 570 of the modified embodiment is employed instead of the cylinder device 110 of the first embodiment. The cylinder device 570 has roughly the same configuration as the cylinder device 110 of the first embodiment. In the following explanation regarding the modified embodiment, constructions and actuations different from those of the first embodiment are described.

In the cylinder device 570, the communication hole 536 and the pressure-intensifying/reducing device 120 communicate with each other via an external communication passage 572, on which a relief valve 574 and a check valve 576 are provided in parallel. Thus, the external communication passage 572 forms a communication passage L3 for a communication between the opposing chamber R7 and the reservoir 122 via the pressure-intensifying/reducing device 120. The relief valve 574 relieves a pressure of the reaction force chamber R8 by a communication between the reaction force chamber R8 and the reservoir 122 only when the pressure of the reaction force chamber R8 increases to some degree. To be more specific, the relief valve 574 is configured to open when the pressure of the reaction force chamber R8 is above a pressure which is higher by a threshold pressure than the input pressure. In the cylinder device 570, the relief valve 574 and the communication passage L3 for the communication between the reaction force chamber R8 and the reservoir 122 constitute a communication-state switching mechanism by which the reaction force chamber R8 communicates with the reservoir 122 only in the case that the pressure of the reaction force chamber R8 exceeds a predetermined pressure (hereinafter, referred to as an "predetermined valve-opening pressure" where appropriate), more specifically, a pressure dependent communication mechanism which realizes a communication state on the basis of the predetermined pressure of the relief valve 574. It is noted that the check valve 576 is provided to allow a flow of the brake fluid from the reservoir 122 to the reaction force chamber R8.

In the cylinder device 570, the predetermined valve-opening pressure of the relief valve 574 is set at a pressure of the reaction force chamber R8 at a moment when the operation amount of the brake pedal 150 is somewhat greater than the hydraulic-brake-beginning amount at the maximum regenerative brake in FIG. 3, in the condition that the input pressure of the first input chamber R3 is at the atmospheric pressure. Accordingly, when the pressure of the reaction force chamber R8 is not more than the predetermined valve-opening pressure in the failure condition, the reaction force chamber R8 is hermetically closed and the inside of the reaction force chamber R8 is pressurized by the elastic forces of the first reaction force spring 482 and the second reaction force spring 492. Those pressurizing forces act as resistance forces against the forward movement of the input piston 406, that is, the operation reaction force against the operation of the brake pedal 150. In the failure condition, when the operation amount of the brake pedal 150 increases and the operation force applied to the brake pedal 150 reach a predetermined threshold operation force, the relief valve 574 opens so that the reaction force chamber R8 communicates with the reservoir 122. When this communication state is realized, the pressure of the reaction force chamber R8 is kept at the predetermined valve-opening pressure and the forward movement of the input piston 406 is allowed in a state in which decrease of the volume of the reaction force chamber R8 is allowed. It is noted that, in this state, a pressure corresponding to the predetermined valve-opening pressure of the relief valve 574 remains in the reaction force chamber R8 and the operation reaction force depending on the pressure continuously acts on the brake pedal 150.

According to the forward movement of the input piston 406, the volume of the inter-piston chamber R6 decreases and the front end of the input piston 406 comes into abutting contact the first auxiliary piston 480. When the operation amount of the brake pedal 150 is further increased, the input piston 406 comes into abutting contact the first pressurizing piston 402 via the first auxiliary piston 480 and the input piston 406 comes into a state in which the input piston 406 can push the first pressurizing piston 402 directly. In the failure condition, the pressure-reducing linear valve 252 is in the open state and the input chamber R3 is at the atmospheric pressure. Then, the driver can push the first pressurizing piston 402 with his own operation force whose magnitude goes over that of the operation reaction force due to the above remaining pressure. As a result, the brake fluid in the first pressurizing chamber R1 is pressurized by the operation force of the driver, and the brake fluid in the second pressurizing chamber R2 is also pressurized by the operation force of the driver. That is, an operation-force dependent pressurizing state is realized in the first pressurizing chamber R1 and the second pressurizing chamber R2.

An actuation in the normal condition is the same as that in the failure condition from the beginning of operation of the brake pedal 150 to a certain stage. However, the pressure-reducing linear valve 252 is supplied with the maximum electric current to be in the close state. In the normal condition, in order to generate the hydraulic brake force, the pressure generated by the high-pressure-source device 118 is inputted into the input chamber R3 in a stage in which the operation amount of the brake pedal 150 does not exceed the above hydraulic-brake-beginning amount at the maximum regenerative brake. Therefore, even though the pressure of the reaction force chamber R8 reaches the above predetermined valve-opening pressure due to an increase of the input pressure, the relief valve 574 is not opened and the hermetical closeness of the reaction force chamber R8 is maintained.

When the pressure generated by the high-pressure-source device 118 is inputted into the input chamber R3, the pressure moves forward the first pressurizing piston 402 and the second pressurizing piston 404, thereby pressurizing the brake fluid in the first pressurizing chamber R1 and the second pressurizing chamber R2. Incidentally, in pressurizing the brake fluid depending on the pressure inputted into the input chamber R3, the reaction force chamber R8 is hermetically closed. Accordingly, in the operation within the above hydraulic-brake-beginning amount at the maximum regenerative brake, the front end of the input piston 406 does not come into abutting contact with the first auxiliary piston 480.

Owing to the above actuation, in the pressurization of the brake fluid depending on the pressure of the input chamber R3, the first pressurizing piston 402 and the second pressurizing piston 404 can move forward depending on neither the operation force applied to the brake pedal 150 nor the operation amount so as to pressurize the brake fluid in the first pressurizing chamber R1 and the second pressurizing chamber R2. That is, a high-pressure-source-pressure dependent pressurizing state is realized in the first pressurizing chamber R1 and the second pressurizing chamber R2.

In the cylinder device 570, the relief valve is employed instead of the open/close valve in the first embodiment. Therefore, when the operation force more than a certain degree is applied, the communication state is realized. Generally speaking, a relief valve is more inexpensive than an electromagnetic open/close valve, thus the cylinder device 570 is relatively inexpensive.

Second Embodiment

Figure 5:
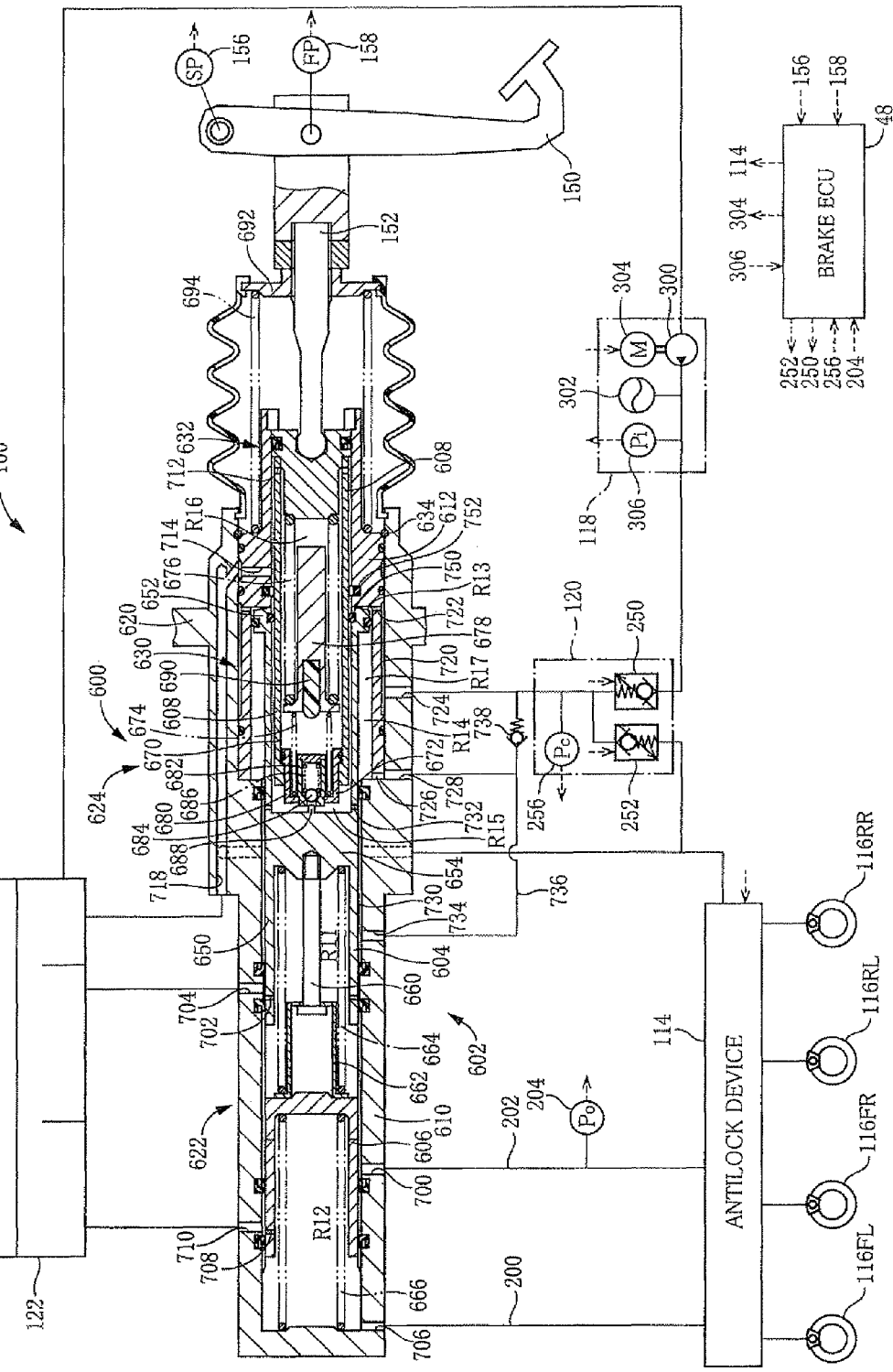
FIG. 5 is a view of a hydraulic brake system including a cylinder device according to the second embodiment of the claimable invention.

FIG. 5 shows the hydraulic brake system 100 in which a cylinder device 600 of the second embodiment is employed instead of the cylinder device 110 of the first embodiment. Incidentally this brake system 100 has roughly the same configuration as the brake system 100 in which the cylinder device 110 of the first embodiment is employed. Therefore, the following explanation regarding this brake system 100 is conducted regarding only the cylinder device 600.

<<Construction of Cylinder Device>>

As shown in FIG. 5, the cylinder device 600 includes a housing 602 which is a casing of the cylinder device 600, a first pressurizing piston 604 and a second pressurizing piston 606 which pressurize the brake fluid to be supplied to the brake devices 116, and an input piston 608 to which the operation of the driver is inputted via the operating device 112. Incidentally, FIG. 5 illustrates a state in which the cylinder device 600 is not under actuation, that is, the operation of the brake is not performed.

The housing 602 is constituted mainly by two members, concretely, a first housing member 610 and a second housing member 612. The first housing member 610 has a shape like a tube, on the whole, whose front end portion is closed and has a flange 620 formed on a circumference of a rear end portion thereof. The first housing member 610 is mounted on the body of the vehicle at the flange 620. The first housing member 610 is sectioned into two portions having mutually different inner diameters, concretely, a front small-diameter portion 622 located in a front side and having a smaller inner diameter, and a rear large-diameter portion 624 located in a rear side and having a larger inner diameter.

The second housing member 612 has a shape like a tube which has a front large-diameter portion 630 located in a front side and having a larger inner diameter, and a rear small-diameter portion 632 located in a rear side and having a smaller inner diameter. The second housing member 612 is fitted into the rear large-diameter portion 624 such that a front end of the front large-diameter portion 630 is in contact with a stepping face which is formed between the front small-diameter portion 622 and the rear large-diameter portion 624 of the first housing member 610. The first housing member 610 and the second housing member 612 are fastened with each other by a lock ring 634 which is embedded on an inner face of a rear end portion of the first housing member 610.

The second pressurizing piston 606 has a shape like a tube whose rear end portion is closed, and is slidably fitted into the front small-diameter portion 622 of the first housing member 610. The first pressurizing piston 604 is shaped such that it has a body portion 650 having a shape like a tube and has a flange portion 652 provided on a rear end portion of the body portion 650. The first pressurizing piston 604 is disposed behind the second pressurizing piston 606. A front portion of the body portion 650 is slidably fitted into a rear side of an inner face of the front small-diameter portion 622 of the first housing member 610 and the flange portion 652 is slidably fitted into an inner face of the front large-diameter portion 630 of the second housing member 612. An inside of the body portion 650 of the first pressurizing piston 604 is sectioned into two portions by a separation wall portion 654 which is provided in the middle of the body portion 650 in an forward-rearward direction thereof. That is, the first pressurizing piston 604 is shaped such that it has two blind holes which open on a front end and a rear end thereof, respectively.

Between the first pressurizing piston 604 and the second pressurizing piston 606, there is defined a first pressurizing chamber R11 for pressurizing the brake fluid which is supplied to the brake devices 116RL, RR provided for the two rear wheels respectively, and in front of the second pressurizing piston 606, there is defined a second pressurizing chamber R12 for pressurizing the brake fluid which is supplied to the brake devices 116FL, FR provided for the two front wheels, respectively. In addition, a distance that the first pressurizing piston 604 and the second pressurizing piston 604 separate from each other is limited so as to fall within a predetermined range by a headed pin 660 screwed on the separation wall portion 654 of the first pressurizing piston 604 so as to extend forward and a pin-retaining tube 662 fixed on a rear end face of the second pressurizing piston 606. In the first pressurizing chamber R11 and the second pressurizing chamber R12, compression coil springs (hereinafter, referred to as a "return springs" where appropriate) 664, 666 are disposed, respectively. Those springs bias the first pressurizing piston 604 and the second pressurizing piston 606 in directions that the pistons 604, 606 separate away from each other and bias the second pressurizing piston 606 rearward.

Behind the first pressurizing piston 604, specifically, behind the flange portion 652 of the first pressurizing piston 604 and between the flange portion 652 and the second housing member 612, there is defined a fluid chamber R13 into which the brake fluid is supplied from the high-pressure-source device 118, that is, the pressure is inputted from the high-pressure-source device 118. Hereinafter, the fluid chamber R13 is referred to as an "input chamber R13" where appropriate. It is noted that the input chamber R13 is illustrated in an almost squeezed state in FIG. 5. Additionally, in the housing 602, there exists a clearance formed between an inner face of the second housing member 612 and an outer face of the body portion 650 of the first pressurizing piston 604. This clearance is defined by a front end face of the flange portion 652 of the first pressurizing piston 604 and a stepping face which is formed between the front small-diameter portion 622 and the rear large-diameter portion 624 of the first housing member 610, thereby forming a ring-shaped chamber. This chamber is an opposing chamber R17 which is opposed to the input chamber R13 with the flange portion 652 of the first pressurizing piston 604 interposed therebetween.

The input piston 608 includes a body portion 670 having a shape like a tube whose front end portion is opened and rear end portion is closed, an auxiliary piston 672 allowed to project from and retract into the body portion 670, a first reaction force spring 674 supporting the auxiliary piston 672, a second reaction force spring 676 disposed behind the first reaction force spring 674 in series, and a floating seat 678 shaped like a rod with a flange, sandwiched between these reaction force springs, and floatingly supported by them. Incidentally, each of the first reaction force spring 674 and the second reaction force spring 676 is a compression coil spring. The input piston 608 is inserted into the housing 602 from a rear end side thereof in a state in which it slidably contacts with an inner face of the rear small diameter portion 632 of the second housing member 612 and is inserted into the first pressurizing piston 604 in a state in which it slidably contacts with an inner face thereof. There is defined a fluid chamber (hereinafter, referred to as an "inter-piston chamber" where appropriate) R15 in front of the input piston 608 and between the first pressurizing piston 604 and the input piston 608.

The auxiliary piston 672 includes an outer tube member 680 on which a hole is provided at a front end face thereof and which has a shape like a tube, an inner tube member 682 which is fixedly fitted in the hole and has a shape like a tube, a ball 684 and a bias spring 686 which are accommodated inside the inner tube member 682. At a front end face of the inner tube member 682, there is provided an opening, to which the ball 684 is pressed forward by a spring reaction force of the bias spring 686 that is a compression coil spring, such that the ball 684 closes the opening. On the separation wall portion 654 located in front of the auxiliary piston 672, there is provided an engagement pin 688 which is inserted through the opening of the inner tube member 682 to engage with the ball 684. Accordingly, where the auxiliary piston 672 moves forward and a distance between the auxiliary piston 672 and the separation wall portion 654 becomes a predetermined distance or less, the engagement pin 688 pushes the ball 684 rearward to open the opening of the inner tube member 682. Thus, in the auxiliary piston 672, a separation of the ball 684 from the opening of the inner tube member 682 constitutes a open/close valve by which the inter-piston chamber R15 and a liquid chamber R16 defined in the input piston 608 (hereinafter, referred to as an "internal chamber" where appropriate) communicate with each other. Incidentally, the internal chamber R16 in the input piston 608 is always at the atmospheric pressure.

The first reaction force spring 674 is supported at a front end portion thereof by a front end portion of the outer tube member 680 of the auxiliary piston 672 and supported at a rear end portion thereof by a front side seat face of the floating seat 678. The second reaction force spring 676 is supported at a rear end portion thereof by a rear end portion of the body portion 670 of the input piston 608 and supported at a front end portion thereof by a rear side seat face of the floating seat 678. Therefore, the first reaction force spring 674 and the second reaction force spring 676 bias the auxiliary piston 672 in a direction in which the auxiliary piston 672 projects from the body portion 670 of the input piston 608, and elastically support the auxiliary piston 672. Incidentally, it is limited that the auxiliary piston 672 projects forward out of the body portion 670 beyond some degree, because the auxiliary piston 672 is stopped by a stopper ring portion provided on a circumferential portion of a rear end of the outer tube member 680 of the auxiliary piston 672 by a step provided on an inner face portion of a front end of the body portion 670 of the input piston 608. In addition, a cushion rubber 690 is embedded in a front end portion of the floating seat 678. Because the cushion rubber 690 abuts on a rear end face of the inner tube member 682 of the auxiliary piston 672, the auxiliary piston 672 and the floating seat 484 are limited so as not to move close to each other beyond a certain distance.

A front end portion of the operation rod 152 is connected to a rear end portion of the input piston 608 so as to transmit, to the input piston 608, the operation force applied to the brake pedal 150 and so as to move the input piston 608 forward and rearward in accordance with the operation amount of the brake pedal 150. Incidentally, the rearward movement of the input piston 608 is limited because the rear end portion thereof is stopped by a rear end portion of the rear small-diameter portion 632 of the second housing member 612. In addition, a spring seat 692 shaped like a disc is fixed on the operation rod 152, and a compression coil spring (hereinafter, referred to as a "return spring" where appropriate) 694 is disposed between the spring seat 692 and the second housing member 612. The return spring 694 biases the operation rod 152 rearward. Incidentally, a boot 694 is provided between the spring seat 692 and the housing 602 to protect a rear portion of the cylinder device 600 from dust.

The first pressurizing chamber R11 communicates with the fluid passage 202 connected to the antilock device 114 via a communication hole 700 whose opening is an output port, and is allowed to communicate with the reservoir 122 via a communication hole 702 provided on the first pressurizing piston 604 and a communication hole 704 whose opening is a drain port. On the other hand, the second pressurizing chamber R12 communicates with the fluid passage 200 connected to the antilock device 114 via a communication hole 706 whose opening is an output port, and is allowed to communicate with the reservoir 122 via a communication hole 708 provided on the second pressurizing piston 606 and a communication hole 710 whose opening is a drain port. In addition, the internal chamber R16 in the input piston 608 communicates with the reservoir 122 via a communication hole 712 provided on the first pressurizing piston 604, a communication hole 714 provided on the second housing member 612, and a communication hole 718 provided on the first housing member 610 and whose opening is a drain port. A portion of the second housing member 612 which is located in a front side thereof has an outer diameter somewhat smaller than an inner diameter of the first housing member 610, whereby, between the housing members 610 and 612, there is formed a fluid passage 720 having a certain cross section area through which the brake fluid can flow. The input chamber R13 communicates with the pressure-intensifying/reducing device 120 via the communication passage 720, a communication hole 722 provided on the second housing member 612, and a communication hole 724 whose opening is an input port.

The opposing chamber R14 can communicate with exteriors via a communication hole 726 provided on the second housing member 612 and a communication hole 728 whose opening is a connection port. The body portion 650 of the first pressurizing piston 604 has an outer diameter somewhat smaller than an inner diameter of front small-diameter portion 622 of the first housing member 610. Between them, there is formed a fluid passage 730 having a certain cross section area through which the brake fluid can flow. The inter-piton chamber R15 can communicate with exteriors via the communication passage 730, a communication hole 732 provided on the first pressurizing piston 604, and a communication hole 734 whose opening is a connection port. The connection port of the communication hole 728 and the connection port of the communication hole 734 communicate with each other via an external communication passage 736, which forms an inter-chamber communication passage for a communication between the opposing chamber R14 and the inter-piston chamber R15. That is, in the cylinder device 600, the opposing chamber R14 and the inter-piston chamber R15 are configured as a single integrated liquid chamber (hereinafter, referred to as a "reaction force chamber" where appropriate) R17 with the inter-chamber communication passage.

In addition, in accordance with the relative movement of the first pressurizing piston 604 and the input piston 608, a volume of the inter-piston chamber R15 increases and decreases while a volume of the opposing chamber R14 decreases and increases. The above inter-chamber communication passage has a function for absorbing the volume change of one fluid chamber by the volume change of the other fluid chamber and vice versa. Incidentally, the cross section area of the opposing chamber R14 is approximately equal to that of the inter-piston chamber R15, whereby the first pressurizing piston 604 is allowed to move relative to the housing 602 while the input piston 608 is prohibited from moving relative to the housing 602.

Furthermore, in the cylinder device 600, the internal chamber R16 in the input piston 608 constitutes a part of a communication passage extending from the reaction force chamber R17 to the reservoir 122. The communication passage is opened or closed by the open/close valve provided in the auxiliary piston 672.

The external communication passage 736 is branched on the way thereof and the branched communication passage is connected to the pressure-intensifying/reducing device 120. Additionally, on the external communication passage 736, there is provided a relief valve 738 for relieve the pressure of the reaction force chamber R17 thorough the pressure-intensifying/reducing device 120 to the reservoir 122 when the pressure is high. More specifically, the reaction force chamber R17 can communicate with the reservoir 122 via the relief valve 738 and the pressure-reducing linear valve 252 of the pressure-intensifying/reducing device 120. Incidentally, the relief valve 738 is configured to open when the pressure of the reaction force chamber R17 is higher by a threshold pressure than a pressure inputted into the input chamber R13. Where the pressure inputted into the input chamber R13 is an atmospheric pressure, the relief valve 738 is configured to open when the pressure of the reaction force chamber R17 is higher by the threshold pressure than the atmospheric pressure. Owing to the above construction, in the cylinder device 600, there is configured a communication-state switching mechanism which realizes a communication between the reaction force chamber R17 and the reservoir 122 by the above communication passage for the communication between the reaction force chamber R17 and the reservoir 122 and by the relief valve 738 only when the pressure of the reaction force chamber R17 exceeds a predetermined pressure (hereinafter, referred to as a "predetermined valve-opening pressure" where appropriate).

<<Actuation of Cylinder Device>>

First, an actuation of the cylinder device 600 in an electrical failure condition is explained. In the failure condition, when the driver starts pressing the brake pedal 150, the body portion 670 of the input piston 608 starts moving forward. Due to the movement, the pressure of the reaction force chamber R17 increases until it reaches the above predetermined pressure. As explained above, because the cross section area of the inter-piston chamber R15 and that of the opposing chamber R14 are approximately equal, the forward movement of the input piston 608 does not move the first pressurizing piston 604 forward. Also, because there is realized a state in which a change of the volume of the inter-piston chamber R15 is prohibited, the auxiliary piston 672 is pushed into the body portion 670 by an increase of the pressure in the reaction force chamber R17, that is, the inter-piston chamber R15 with compressing the first reaction force spring 674 and the second reaction force spring 676. In other words, there is realized a state in which the auxiliary piston 672 is retracted into the body portion 670 by an amount according with the pressure in the reaction force chamber R17.

An amount of each of elastic deformations of the first reaction force spring 674 and the second reaction force spring 676, namely, a compression amount depends on the increase of the pressure in the reaction force chamber R17. From another point of view, the fluid in the reaction force chamber R17 is pressurized according to the elastic forces of the first reaction force spring 674 and the second reaction force spring 676, and an operation reaction force in accordance with the pressure in the reaction force chamber R17 is applied to the operation member via the input piston. In other words, the force depending on the pressurizations of the two reaction force springs 674, 676 acts as a resistance force against the forward movement of the input piston 608, that is, the operation reaction force against the operation of the brake pedal 150. The cylinder device 600 having such a configuration is equipped with a mechanism including the auxiliary piston 672, the first reaction force spring 674, the second reaction spring 676, and the floating seat 678, namely, an elastic-force dependent pressurizing mechanism which can pressurize the fluid in the reaction force chamber R17 depending on the elastic forces of the first reaction force spring 674 and the second reaction force spring 676.

The above operation reaction force depends on the forward movement amount of the input piston 608, that is, the operation amount of the brake pedal 150. In the cylinder device 600, a magnitude of the operation reaction force with respect to the operation amount of the brake pedal 150 accords to the characteristic shown in FIG. 3 explained above. It is understood from the characteristic that the operation reaction force increases, as the operation amount of the brake pedal 150 increases. Where the operation amount of the brake pedal 150 increases beyond the operation-reaction-force inclination change amount, a change of the operation reaction force with respect to a change of the operation amount becomes large, that is, an increase gradient of the operation reaction force becomes large. Such a characteristic is realized by that a pressurizing force of the first reaction force spring 674, that is, one of the two reaction force springs 674, 676 is prohibited from increasing where the operation amount of the brake pedal 150 exceeds the operation-reaction-force inclination change amount. More specifically, the rear end face of the inner tube member 682 of the auxiliary piston 672 comes into abutting contact with the cushion rubber 690 embedded in the floating seat 678, the first reaction force spring 674 can not elastically deform, and thereafter only the second reaction force spring 676 elastically deforms. In the cylinder device 600, a spring constant of the first reaction force spring 674 is considerably smaller than that of the second reaction force spring 676. As a result, an incline of a change of the operation reaction force is small in a rather small operation amount and becomes considerably large when the operation amount exceeds the operation-reaction-force inclination change amount.

In a state in which the pressure from the high-pressure-source device 118 is not inputted, the predetermined valve-opening pressure of the relief valve 738 is set at a pressure of the reaction force chamber R17 at a moment when the operation amount of the brake pedal 150 is somewhat greater than the hydraulic-brake-beginning amount at the maximum regenerative brake in FIG. 3. When the operation amount of the brake pedal 150 increases so that the operation force applied to the brake pedal 150 reaches a predetermined threshold operation force, the relief valve 738 opens so that the reaction force chamber R17 communicates with the reservoir 122 thorough the pressure-reducing linear valve 252 which is in the open state. When this communication state is realized, the pressure of the reaction force chamber R17 is kept at the predetermined valve-opening pressure and the forward movement of the input piston 608 is allowed in a state in which decrease of the volume of the reaction force chamber R17 is allowed. In the cylinder device 600 having such a structure, the above communication-state switching mechanism for the communication between the reaction force chamber R17 and the reservoir 122 is a pressure dependent communication mechanism which selectively realize a reaction force chamber communication state in which the reaction force chamber R17 and the reservoir 122 communicate with each other and a reaction force chamber not-communication state in which they does not. The communication passage in the communication-state switching mechanism is a passage for the pressure dependent communication mechanism.

As the operation of the brake pedal 150 proceeds, the auxiliary piston 672 moves forward together with the input piston 608 to some extent. Where the distance between the auxiliary piston 672 and the separation wall portion 654 becomes smaller than the predetermined distance, the pin 688 provided on the separation wall portion 654 pushes rearward the ball 684 constituting the open/close valve provided in the auxiliary piston 672, whereby the reaction force chamber R17 communicates with the reservoir 122 via the internal chamber R16 in the input piston 608. The cylinder device 600 having such a structure is equipped with a mechanism which includes the auxiliary piston 542 and the communication passage extending from the reaction force chamber R17 to the reservoir 122, namely, a volume dependent communication mechanism which selectively realizes, on the basis of the volume of the reaction force chamber, a reaction force chamber communication state in which the reaction force chamber R17 and the reservoir 122 communicate with each other and a reaction force chamber not-communication state in which they do not. Incidentally, this communication passage is a communication passage for the volume dependent communication mechanism by which the reaction force chamber R17 communicates with reservoir 122.

When the reaction force chamber communication state is realized by the above volume dependent communication mechanism, the reaction force chamber R17 is at the atmospheric pressure, thereby allowing the input piston 608 to move forward relatively freely. Therefore, the input piston 608 comes into abutting contact with the separation wall portion 654 so as to directly push the first pressurizing piston 604. In this state, the operation force applied to the brake pedal 150 is directly transmitted to the first pressurizing piston 604. That is, the driver can directly push the first pressurizing piston 604. Incidentally, because the pressure-reducing linear valve 252 is in the open state, the input chamber R13 is always at the atmospheric pressure, whereby a resistance force against the forward movement of the first pressurizing piston 604 is not generated.

The forward movement of the first pressurizing piston 604 terminates the communication between the first pressurizing chamber R11 and the reservoir 122, and the brake fluid in the first pressurizing chamber R11 is pressurized by the operation force of the driver. In accordance with the pressurization of the first pressurizing chamber R11, the second pressurizing piston 606 also moves forward, whereby the communication between the second pressurizing chamber R12 and the reservoir 122 is terminated like the communication between the first pressurizing chamber R11 and the reservoir 122, and the brake fluid in the second pressurizing chamber R12 is also pressurized. Thus, an operation-force dependent pressurizing state is realized in which the brake fluid in the first pressurizing chamber R11 and the second pressurizing chamber R12 is pressurized by the operation force applied to the brake pedal 150, and a fluid pressure according to the operation force of the driver is inputted to the brake device 116.

When the driver stops the brake operation, that is, the application of the operation force to the brake pedal 150 is stopped, the first pressurizing piston 604 and the second pressurizing piston 606 are respectively returned to their initial positions (positions illustrated in FIG. 4, that is, positions in a state in which a rear end portion of the first pressurizing piston 604 comes into abutting contact with the rear end portion of the second housing member 612) by the return springs 664, 666. On the other hand, the input piston 608, together with the operation rod 152, is returned to an initial position (a position illustrated in FIG. 4, that is, a position in which the rear end of the input piston 608 is stopped by a rear end portion of the second housing member 612).

Next, an actuation in the normal condition is explained below. In the normal condition, the maximum current is supplied to the pressure-reducing linear valve 252, whereby it is put in the close state. However, a forward movement of the input piston 608, a pressure change of the reaction force chamber R17, an operation of the elastic force dependent pressurizing mechanism, and a relation between the operation amount of the brake pedal 150 and the operation reaction force etc. are not different from those in the above failure condition. In the normal condition, in order to generate the hydraulic brake force, the pressure generated by the high-pressure-source device 118 is inputted into the input chamber R13 in a stage in which the operation amount of the brake pedal 150 does not exceed the above hydraulic-brake-beginning amount at the maximum regenerative brake. Incidentally, even though the pressure of the reaction force chamber R17 reaches the above predetermined valve-opening pressure due to an increase of the input pressure, the relief valve 738 is not opened.

When the pressure generated by the high-pressure-source device 118 is inputted into the input chamber R13 in order to generate the hydraulic brake force in the middle of the above brake operation, the first pressurizing piston 604 and the second pressurizing piston 606 is moved forward by the pressure so as to pressurize the brake fluid in the first pressurizing chamber R11 and the second pressurizing chamber R12. In the pressurization of the brake fluid depending on the pressure inputted into the input chamber R13, because the reaction force chamber R17 is hermetically closed, the front end of the input piston 608 does not come into abutting contact with the separation wall portion 654 of the first pressurizing piston 604, where the operation is conducted within the above hydraulic-brake-beginning amount at the maximum regenerative brake. In addition, because a pressurized area which is an area of a front end face of the flange portion 652 of the first pressurizing piston 604 and to which a pressure is applied is almost equal to a pressurized area which is an area of the front end face of the input piston 608 and to which a pressure is applied, the forward movement of the first pressurizing piston 604 does not affect the forward and rearward movements of the input piston 608. That is, it has a structure in which the operation amount of the brake pedal 150 and the operation force do not change.

When the brake fluid is pressurized depending on the pressure in the input chamber R13 by the above actuation, the first pressurizing piston 604 and the second pressurizing piston 606 move forward depending on neither the operation force applied to the brake pedal 150 nor the operation amount, thereby pressurizing the brake fluid in the first pressurizing chamber R11 and the second pressurizing chamber R12. That is, there is realized a high-pressure-source-pressure dependent pressurizing state in which the brake fluid in the first pressurizing chamber R11 and the second pressurizing chamber R12 is pressurized depending on the pressure from the high pressure source, irrespective of the forward movement of the input piston 608. The brake force generated by the cylinder device 600, namely, the hydraulic brake force is determined by the pressure of the inputted brake fluid. In the normal condition, the controlled high-pressure-source pressure is controlled by the pressure-intensifying/reducing device 120. Accordingly, the pressure controlled at a required degree is inputted into the input chamber R13.

In the normal condition, the pressure controlled by the pressure-intensifying/reducing device 120 may be inputted into the input chamber R13 to generate the hydraulic brake force whose magnitude corresponds to the magnitude obtained by subtracting the regenerative brake force from the target brake force. In many cases, the hydraulic brake force may be generated after a time point when the target brake force exceeds the available-maximum-regenerative brake force. Incidentally, there is an instance in which the hydraulic brake force is required due to an amount of charge of the battery 26 etc. even when the target brake force is not above the available-maximum-regenerative brake force. In this instance, the pressure from the high-pressure-source device 118 may be inputted into the input chamber R13 before the operation amount reaches the hydraulic-brake-beginning amount at the maximum regenerative brake.

As explained above, in the vehicle, the hydraulic brake system 100 may generate the hydraulic brake force whose magnitude corresponds to a magnitude obtained by subtracting the regenerative brake force from the target brake force. In an extreme sense, as long as the target brake force can be provided by the regenerative brake force, the hydraulic brake force to be generated by the hydraulic brake system 100 is not required. The cylinder device 600 is configured to generate, in the normal condition, the operation reaction force in accordance with the operation amount of the brake pedal 150 without depending on the generated hydraulic brake force. In an extreme sense, the cylinder device 600 has a function of permitting the operation of the brake pedal 150 under a state in which the brake fluid is not pressurized by the first pressurizing piston 604 and the second pressurizing piston 606. That is, the cylinder device 600 has a favorable stroke simulator for the hybrid vehicle.

Even in the normal condition, when the operation of the brake is finished, the pressure-reducing linear valve 252 is put in the open state; the first pressurizing piston 604 and the second pressurizing piston 606 are respectively returned to their initial positions by the return springs 664, 666; and the input piston 608 is returned to the initial position by the return spring 694.

<<Features of Hydraulic Brake System>>

In the cylinder device 600, the input piston 608 is inserted in the blind hole provided on the first pressurizing piston 600. Therefore, high pressure seals required to slidably contact with the input piston 608 for defining the above respective liquid chambers are disposed one-by-one between the inner face of the blind hole of the first pressurizing piston 604 and an outer face of the input piston 608 and between the second housing member 612 and the outer face of the input piston 608, respectively. More specifically, they are the seal 750 and the seal 752. Therefore, a friction resistance against the movement of the input piston 608 is relatively small, which reduces an influence that the friction resistance gives to operational feeling of the operation member, that is, an influence that is given to operational feeling in the brake operation.

Moreover, in the cylinder device 600, the stroke simulator includes the elastic force dependent pressurizing mechanism pressurizing the reaction force chamber R17. The first reaction force spring 674 and the second reaction force spring 676 constituting the stroke simulator are disposed inside the cylinder device 600, specifically, inside the input piston 608, thereby realizing a compact cylinder device.

Furthermore, in the cylinder device 600, one reaction force chamber R17 is formed in a state in which the inter-piston chamber R15 and the opposing chamber R14 communicate with each other, whereby the volume of the inter-piston chamber R15 is set relatively small. That is, a distance between the front end of the input piston 608 and the bottom of the blind hole of the first pressurizing piston 604 is set relatively short. Accordingly, a distance which is necessary for the input piston 608 to move forward to come into abutting contact with the first pressurizing piston 604 is short, whereby in the cylinder device 600, an operational feeling in the brake operation in the failure condition etc. is made favorable by reducing the operation amount from a beginning of the brake operation to an actuation of the brake device.

Incidentally, in the cylinder device 600, the relief valve 738 is provided as a means for a communication between the reaction force chamber R17 and the reservoir 122. Therefore, when the operation force more than a certain degree is applied in the failure condition, the communication state is realized. Generally speaking, a relief valve is more inexpensive than a electromagnetic open/close valve, thus the cylinder device 600 is relatively inexpensive.

Incidentally, in the failure condition, when the relief valve 738 is opened and the communication state is realized in which the reaction force chamber R17 and the reservoir 122 communicate with each other, the operation reaction force corresponding to the predetermined valve-opening pressure of the relief valve 738 is continuously applied for the operation of the brake pedal 150 thereafter. In the cylinder device 600, when the front end of the input piston 608 comes close to the bottom of the blind hole beyond a certain distance, the open/close valve provided in the auxiliary piston 672 realizes the communication state in which the reaction force chamber R17 and the reservoir 122 communicate with each other, whereby the operation reaction force due to a remaining pressure in the pressure chamber is not generated for the operation of the brake pedal 150 thereafter, thereby reducing a loss which is caused by that the operation force is utilized for other than pressurizing by the pressurizing piston.

<<Modified Embodiment>>

Figure 6:
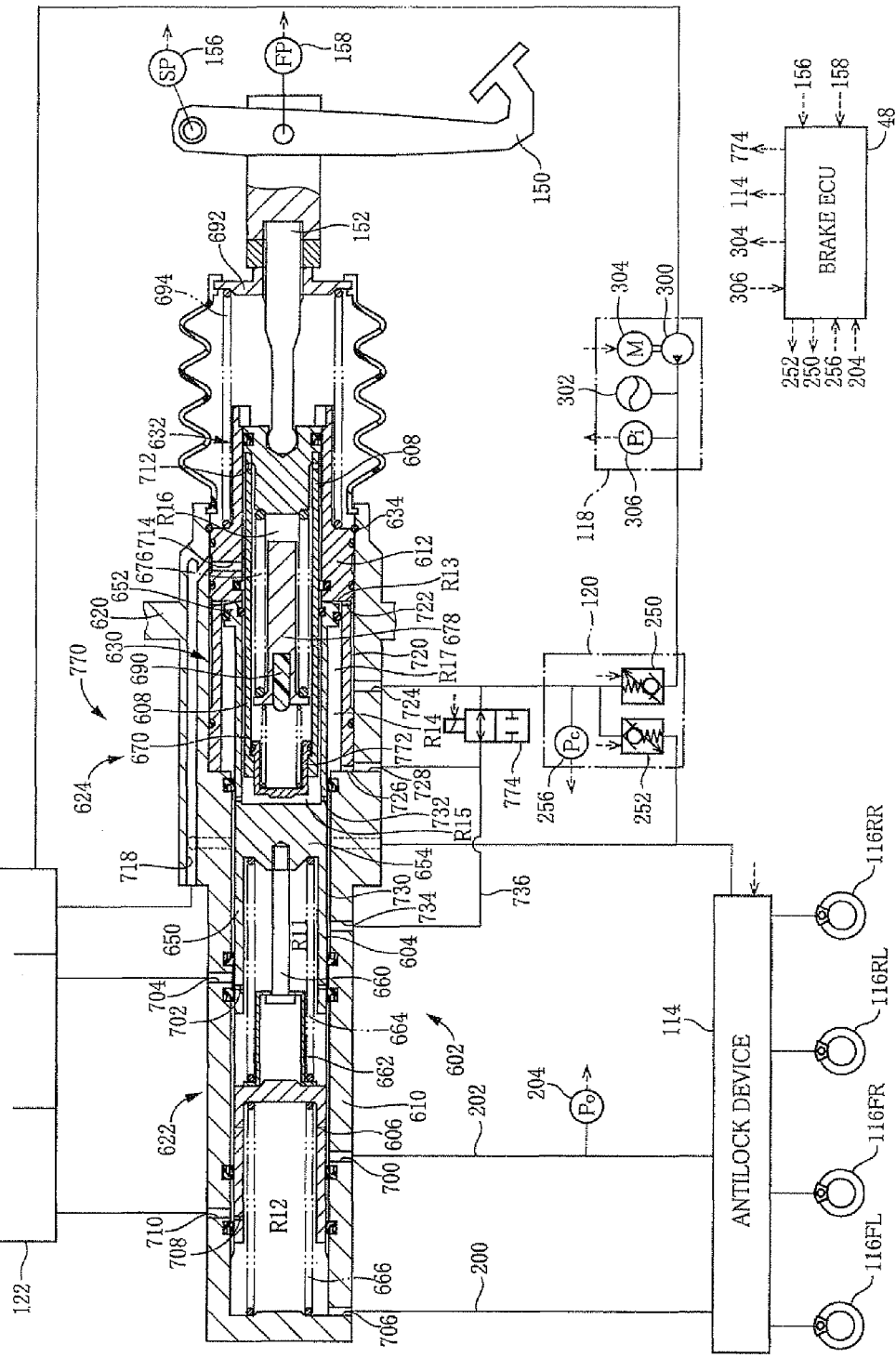
FIG. 6 is a view of a hydraulic brake system including a cylinder device according to a modified embodiment of the second embodiment.

FIG. 6 shows the hydraulic brake system 100 in which a cylinder device 770 of the modified embodiment is employed instead of the cylinder device 600 of the second embodiment. The cylinder device 770 has roughly the same configuration as the cylinder device 600 of the second embodiment. In the following explanation regarding the modified embodiment, constructions and actuations different from those of the second embodiment are described. An auxiliary piston 772 of the cylinder device 770 is constituted by a single member having a shape with a bottom. Different from the cylinder device 600, the auxiliary piston 772 does not have an open/close valve. With respect to this, the engagement pin 688 is not provided on the separation wall portion 654. By the way, on a communication passage which is branched from the external communication passage 736 and connected to the pressure-intensifying/reducing device 120, there is provided an electromagnetic open/close valve 774 which opens in a not-energized state and closes in an energized state.

In the electrical failure condition, because the open/close valve 774 is in the close state, the reaction force chamber R17 is at the atmospheric pressure, and the input piston 608 can freely move forward after a moment at a beginning of the operation of the brake pedal 150. As a result, the front end of the input piston 608 comes into abutting contact with the separation wall portion 654 of the first pressurizing piston 604 at an early stage, whereby an operation-force dependent pressurizing state is realized. In the normal condition, the open/close valve 774 is energized to be in the open state, thereby hermetically closing the reaction force chamber R17. Therefore, in the normal condition, the cylinder device 770 is actuated in the same way that the cylinder device 600 does in the normal condition.

REFERENCE SIGNS LIST

100: cylinder device 116: brake device 118: external high-pressure-source device 122: reservoir 150: brake pedal (operation member) 400: housing 402: first pressurizing piston (pressurizing piston) 406: input piston 460: body portion 462: flange portion 480: first auxiliary piston 482: first reaction force spring 490: second auxiliary piston 492: second reaction force spring 542: open/close valve 570: cylinder device 600: cylinder device 604: first pressurizing piston (pressurizing piston) 608: input piston 650: body portion (main body) 652: flange portion 672: auxiliary piston (front end member) 674: first reaction force spring 676: second auxiliary piston 770: cylinder device R1: first pressurizing chamber R2: second pressurizing chamber R3: input chamber R6: inter-piston chamber R7: opposing chamber R8: reaction force chamber R11: first pressurizing chamber R12: second pressurizing chamber R13: input chamber R14: opposite chamber R15: inter-piston chamber R16: internal chamber R17: reaction force chamber L2: communication passage 570: cylinder device 572: external communication passage (communication passage) 574: relief valve 600: cylinder device 602: housing 604: first pressurizing piston (pressurizing piston) 608: input piston 650: body portion 652: flange portion 670: body portion (main body member) 672: auxiliary piston (front end member) 674: first reaction force spring 676: second auxiliary piston 678: floating seat 678: floating seat 680: outer tube member 682: inner tube member 684: ball 686: bias spring 688: engagement pin 736: external communication passage (communication passage) 738: relief valve R11: first pressurizing chamber R12: second pressurizing chamber R13: input chamber R14: opposite chamber R15: inter-piston chamber R16: internal chamber R17: reaction force chamber 770: cylinder device 772: auxiliary piston 774: open/close valve

The invention claimed is:

1. A cylinder device which supplies, in order to operate a brake device provided at a wheel, a pressurized brake fluid to the brake device, comprising:
    a housing whose front end portion is closed and which is shaped like a tube;
    a pressurizing piston which has a main body portion, a flange portion formed on a circumference of the main body portion, and a blind hole opening at a rear end of the pressurizing piston and which is disposed in the housing so as to define (A) a pressurizing chamber which is located in a front side of the pressurizing piston and which pressurizes the brake fluid supplied to the brake device, (B) an input chamber in which a pressure from a high pressure source is inputted in a rear side of the flange portion, and (C) an opposing chamber which is located in a front side of the flange portion with the flange portion interposed between the input chamber and the opposing chamber and which is opposed to the input chamber, respectively;
    an input piston which is inserted in the blind hole of the pressurizing piston so as to define an inter-piston chamber in front of the input piston by the input piston and the pressurizing piston, and which is connected to an operation member at a rear end of the input piston;
    an inter-chamber communication passage which always permits communication between the opposing chamber and the inter-piston chamber such that the opposing chamber and the inter-piston chamber serve as a single operation-reaction-force chamber, for accommodating a volume change of the opposing chamber and a volume change of the inter-piston chamber with each other that are caused by a forward and rearward movement of the pressurizing piston;
an elastic-force dependent pressurizing mechanism which pressurizes the operation-reaction-force chamber formed by the inter-chamber communication passage depending on elastic force; and
a communication-state switching mechanism which selectively realizes a communication state in which the reservoir and the operation-reaction-force chamber communicate with each other and a not-communication state in which they do not communicate with each other, and
wherein the cylinder device is configured such that,
in the not-communication state, an operation reaction force, in accordance with an operation amount of the operation member, is generated depending on the pressurization of the operation-reaction-force chamber by the elastic-force dependent pressurizing mechanism, while the brake fluid in the pressurizing chamber is permitted to be pressurized in accordance with the pressure inputted from the high pressure source to the input chamber;
in the communication state, a volume of the operation-reaction-force chamber is permitted to be reduced, thereby permitting the input piston to come into abutting contact with the pressurizing piston by a forward movement of the input piston, whereby the brake fluid in the pressurizing chamber is permitted to be pressurized by the operation force applied to the operation member.

2. The cylinder device according to claim 1,
wherein the cylinder device includes:
a first auxiliary piston which is disposed in the bottom of the blind hole and which defines the inter-piston chamber together with the input piston;
a first spring which elastically supports the first auxiliary piston;
a second auxiliary piston which is disposed between an outer face of the main body portion of the pressurizing piston and an inner face of the housing and which defines a front side of the opposing chamber; and
a second spring which elastically supports the second auxiliary piston, and
wherein the cylinder device is configured such that the elastic-force dependent pressurizing mechanism includes the first auxiliary piston, the first spring, the second auxiliary piston and the second spring, and such that, in the communication state, the input piston comes into abutting contact with the pressurizing piston via the first auxiliary piston.

3. The cylinder device according to claim 2,
wherein the elastic-force dependent pressurizing mechanism is configured such that one of a pressurizing force of the first spring and a pressurizing force of the second spring does not increase, when the input piston is moved forward in the not-communication state and an amount of the forward movement thereof goes beyond a predetermined amount.

4. The cylinder device according to claim 1,
wherein the cylinder device includes, in the bottom of the blind hole of the pressurizing piston, (a) an auxiliary piston which defines the inter-piston chamber together with the input piston and (b) a spring which elastically supports the auxiliary piston, and
wherein the cylinder device is configured such that the elastic-force dependent pressurizing mechanism includes the auxiliary piston and the spring, and such that, in the communication state, the input piston comes into abutting contact with the pressurizing piston via the auxiliary piston.

5. The cylinder device according to claim 1,
wherein the cylinder device includes:
an auxiliary piston which is disposed between an outer face of the main body portion of the pressurizing piston and an inner face of the housing and which defines a front side of the opposing chamber; and
a spring which elastically supports the auxiliary piston, and
wherein the cylinder device is configured such that the elastic-force dependent pressurizing mechanism includes the auxiliary piston and the spring.

6. The cylinder device according to claim 1,
wherein the input piston includes a main body member which has a shape like a tube, a front end member which closes a front end portion of the main body member such that an internal chamber is defined inside of the main body member and which is allowed to project from and retract into the main body member, and a spring which is disposed in the internal chamber and which biases the front end member in a direction in which the front end member projects,
wherein the elastic-force dependent pressurizing mechanism includes the spring, and
wherein the cylinder device is configured such that, in the communication state, the front end portion of the main body member of the input piston comes into abutting contact with the pressurizing piston.

7. The cylinder device according to claim 6,
wherein the input piston includes:
two springs each of which functions as the spring, one end portion of one of which is supported by one of the main body member and the front end member, and one end portion of the other of which is supported by the other of the main body member and the front end member, which are disposed in a line, and spring constants of which are different from each other; and
a floating sheet which is floatingly supported by the two springs so as to be sandwiched between the other end portion of the one of the two springs and the other end portion of the other of the two springs, and which connects the two springs so as to apply elastic forces of the two springs on the front end member, and
wherein the elastic-force dependent pressurizing mechanism includes:
the two spring and the floating seat; and
the cylinder device is configured such that a displacement of the floating seat relative to one of the main body member and the front end member is prohibited so as not to increase an amount of elastic deformation of one of the two springs, where, in a process of retraction of the front end member relative to the main body member, an amount of the retraction exceeds a predetermined amount.

8. The cylinder device according to claim 1,
wherein the communication-state switching mechanism includes a passage for the communication between the operation-reaction-force chamber and the reservoir, and an open/close valve which is provided in the passage and which opens or closes the passage.

9. The cylinder device according to claim 1,
wherein the communication-state switching mechanism includes a passage for the communication between the operation-reaction-force chamber and the reservoir, and a relief valve which opens only when a pressure of the operation-reaction-force chamber exceeds a predetermined pressure.

* * * * *